US010816510B1

(12) United States Patent
Tapia et al.

(10) Patent No.: US 10,816,510 B1
(45) Date of Patent: Oct. 27, 2020

(54) SYSTEM AND METHOD FOR USING EDDY CURRENT EDGE EFFECT TO MEASURE A GAP BETWEEN TWO CONDUCTIVE PARTS

(71) Applicant: The Boeing Company, Chicago, IL (US)

(72) Inventors: William J. Tapia, Graham, WA (US); Michael D. Fogarty, Auburn, WA (US)

(73) Assignee: The Boeing Company, Chicago, IL (US)

( * ) Notice: Subject to any disclaimer, the term of this patent is extended or adjusted under 35 U.S.C. 154(b) by 90 days.

(21) Appl. No.: 16/389,939

(22) Filed: Apr. 20, 2019

(51) Int. Cl.
 *G01N 27/90* (2006.01)
 *G01B 7/14* (2006.01)
 *G08B 21/18* (2006.01)

(52) U.S. Cl.
 CPC ......... *G01N 27/9033* (2013.01); *G01B 7/142* (2013.01); *G08B 21/18* (2013.01)

(58) Field of Classification Search
 CPC ..... G01N 27/9033; G08B 21/18; G01B 7/142
 See application file for complete search history.

(56) References Cited

U.S. PATENT DOCUMENTS

| 6,815,947 B2 | 11/2004 | Scheiner et al. |
| 7,750,626 B2 | 7/2010 | Lefebvre et al. |
| 8,284,560 B2 | 10/2012 | Iravani et al. |
| 9,316,617 B2 | 4/2016 | Graebner |
| 2014/0305217 A1* | 10/2014 | Tapia ................. G01N 27/9013 73/618 |
| 2015/0215584 A1* | 7/2015 | Tapia ................. G01M 5/0091 348/125 |
| 2019/0154561 A1* | 5/2019 | Tat ....................... G01N 29/043 |

FOREIGN PATENT DOCUMENTS

CN  101929833 A  12/2010

* cited by examiner

*Primary Examiner* — Giovanni Astacio-Oquendo

(57) ABSTRACT

There is provided a system for using eddy current edge effect to measure a gap between two conductive parts. The system includes the two conductive parts, each having predetermined properties. The system includes a probe having a housing with a coil, and includes a reference gap standard, based on one or more reference gap measurements taken between at least two reference conductive parts separated by a gap distance, as specified by predetermined engineering requirements. The system includes an inspection instrument assembly coupled to the probe and having an inspection apparatus calibrated to the probe and the reference gap standard. The probe with the coil uses the eddy current edge effect to take the gap measurement and measure the gap. The gap measurement is compared to the reference gap standard, to determine whether the gap measurement is an acceptable result or an unacceptable result, based on the predetermined engineering requirements.

20 Claims, 10 Drawing Sheets

SYSTEM AND METHOD FOR USING EDDY CURRENT EDGE EFFECT TO MEASURE A GAP BETWEEN TWO CONDUCTIVE PARTS

FIELD

The disclosure relates generally to methods and systems for measuring gaps between two parts to be fastened together, and more particularly, to methods and systems using eddy current edge effect for measuring a gap between two conductive parts to be fastened together, such as two aircraft conductive parts.

BACKGROUND

Known systems and methods exist for inspecting and measuring gaps between two parts, such as between two aircraft conductive parts, for example, gaps between an aircraft skin panel and an aircraft stringer, between an aircraft skin panel and an aircraft rib, between overlapping outer and inner aircraft skin panels, or between other aircraft conductive parts. Such known systems and methods may include visual inspection of the gaps, and the use of a feeler gauge to measure the gaps.

However, such visual inspection and use of a feeler gauge may not be practical for inspecting and measuring gaps that are inaccessible, or for inspecting and measuring gaps through open holes of two aircraft conductive parts, where fitment may be an issue prior to fastening the two aircraft conductive parts together. Moreover, sealants may be used on surfaces of the aircraft conductive parts, and such sealants may mask certain areas and make it a challenge to visually inspect and measure the gaps. Further, such visual inspection and use of a feeler gauge are typically manual methods that require a human to perform the task, and they may be time consuming to perform.

In addition, known devices and methods exist for inspecting and measuring gaps that are inaccessible, and for inspecting and measuring gaps through open holes between two aircraft conductive parts. For example, optical devices and methods may be used, including the use of a borescope. A borescope is an optical device consisting of a rigid or flexible tube with an eyepiece or display on one end, an objective lens or camera on the other end, and an optical or electrical system in between the ends.

However, such optical devices and methods, including the use of a borescope, may require that the optical device be positioned properly to obtain an accurate reading, and there may not be sufficient space in an area, such as an open hole, to properly position the optical device. For example, the diameter of the optical device, such as the borescope, may be larger than the open hole through which the optical device, such as the borescope, is to be inserted. In addition, the use of such optical devices, including the borescope, is typically a manual method that requires a human to perform the task of taking readings with such optical devices, including the borescope, and this may be time consuming to perform.

In addition, eddy current testing systems and methods are widely used to measure the conductivity of conductive parts, such as aircraft conductive parts, as well as to detect cracks or flaws in such conductive parts. However, it is believed that such eddy current testing systems and methods have not been used to measure gaps through open holes of two conductive parts, such as two aircraft conductive parts, to be fastened together.

Accordingly, there is a need in the art for a system and a method to measure gaps between conductive parts, and in particular, to measure gaps through open holes of two conductive parts, such as two aircraft conductive parts, that improve the time to perform the measuring and the accuracy of the measurements taken, that are automated, that allow inspection and measurement of inaccessible areas, that allow visibility through sealants, that utilize eddy current testing systems and methods, and that provide advantages over known devices, systems, and methods.

SUMMARY

Example implementations of this disclosure provide a system and a method to measure gaps between conductive parts, and in particular, to measure gaps through open holes of two conductive parts, such as two aircraft conductive parts, using eddy current edge effect, and provide significant advantages over known devices, systems, and methods.

In one version there is provided a system for using eddy current edge effect to measure a gap between two conductive parts. The system comprises two conductive parts, each having a plurality of predetermined properties comprising a material type, a material thickness, and a diameter of a through hole formed through each of the two conductive parts.

The system further comprises a probe comprising a housing with a coil mounted within the housing. The probe is configured to contact the two conductive parts to take a gap measurement. The system further comprises a reference gap standard, based on one or more reference gap measurements taken between at least two reference conductive parts separated by a gap distance, as specified by predetermined engineering requirements.

The system further comprises an inspection instrument assembly coupled to the probe. The inspection instrument assembly comprises an inspection apparatus calibrated to the probe and to the reference gap standard.

The probe is inserted into the through hole formed through each of the two conductive parts, and the probe with the coil uses the eddy current edge effect to take the gap measurement and measure the gap between the two conductive parts. The gap measurement is compared to the reference gap standard, to determine whether the gap measurement is an acceptable result or an unacceptable result, based on the predetermined engineering requirements.

In another version there is provided an automated system for using eddy current edge effect to measure a gap between two aircraft conductive parts. The automated system comprises the two aircraft conductive parts, each having a plurality of predetermined properties comprising a material type, a material thickness, and a diameter of a through hole formed through each of the two aircraft conductive parts.

The automated system further comprises an eddy current probe comprising a housing with a coil mounted within the housing. The eddy current probe is configured to contact the two aircraft conductive parts to take a gap measurement comprising a gap width of the gap between the two aircraft conductive parts. The automated system further comprises a reference gap standard, based on one or more reference gap measurements, taken between at least two reference conductive parts separated by a gap distance, as specified by predetermined engineering requirements.

The automated system further comprises an inspection instrument assembly coupled to the eddy current probe. The inspection instrument assembly comprises an oscilloscope calibrated to the eddy current probe and to the reference gap standard. The inspection instrument assembly further comprises an alarm device.

The eddy current probe is inserted into the through hole formed through each of the two aircraft conductive parts. The eddy current probe with the coil uses the eddy current edge effect to take the gap measurement comprising the gap width and measure the gap between the two aircraft conductive parts. The gap measurement is compared to the reference gap standard, to determine whether the gap measurement is an acceptable result or an unacceptable result, based on the predetermined engineering requirements. The alarm device is activated when the gap measurement that is taken is the unacceptable result.

In another version there is provided a method for using eddy current edge effect to measure a gap between two conductive parts. The method comprises the step of determining a plurality of predetermined properties for the two conductive parts. The plurality of predetermined properties comprises a material type, a material thickness, and a diameter of a through hole formed through each of the two conductive parts.

The method further comprises the step of selecting a probe, based on the plurality of predetermined properties of the two conductive parts, to optimize a gap measurement taken with the probe. The probe comprises a housing with a coil mounted within the housing.

The method further comprises the step of selecting a reference gap standard, based on one or more reference gap measurements, taken between at least two reference conductive parts separated by a gap distance, as specified by predetermined engineering requirements. The method further comprises the step of calibrating an inspection apparatus to the probe and to the reference gap standard.

The method further comprises the step of inserting the probe into the through hole formed through each of the two conductive parts, and the probe with the coil using the eddy current edge effect, to take the gap measurement and measure the gap between the two conductive parts. The method further comprises the step of comparing the gap measurement to the reference gap standard, to determine whether the gap measurement is an acceptable result or an unacceptable result. The method further comprises the step of accepting or rejecting the gap measurement, based on the comparing step and based on the predetermined engineering requirements.

The features, functions, and advantages that have been discussed can be achieved independently in various versions or examples of the disclosure or may be combined in yet other versions or examples, further details of which can be seen with reference to the following description and drawings.

BRIEF DESCRIPTION OF THE DRAWINGS

The disclosure can be better understood with reference to the following detailed description taken in conjunction with the accompanying drawings which illustrate exemplary versions or examples, but which are not necessarily drawn to scale, wherein.

Each figure shown in this disclosure shows a variation of an aspect of the examples presented, and only differences will be discussed in detail.

DETAILED DESCRIPTION

Disclosed versions or examples will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

Figure 1:
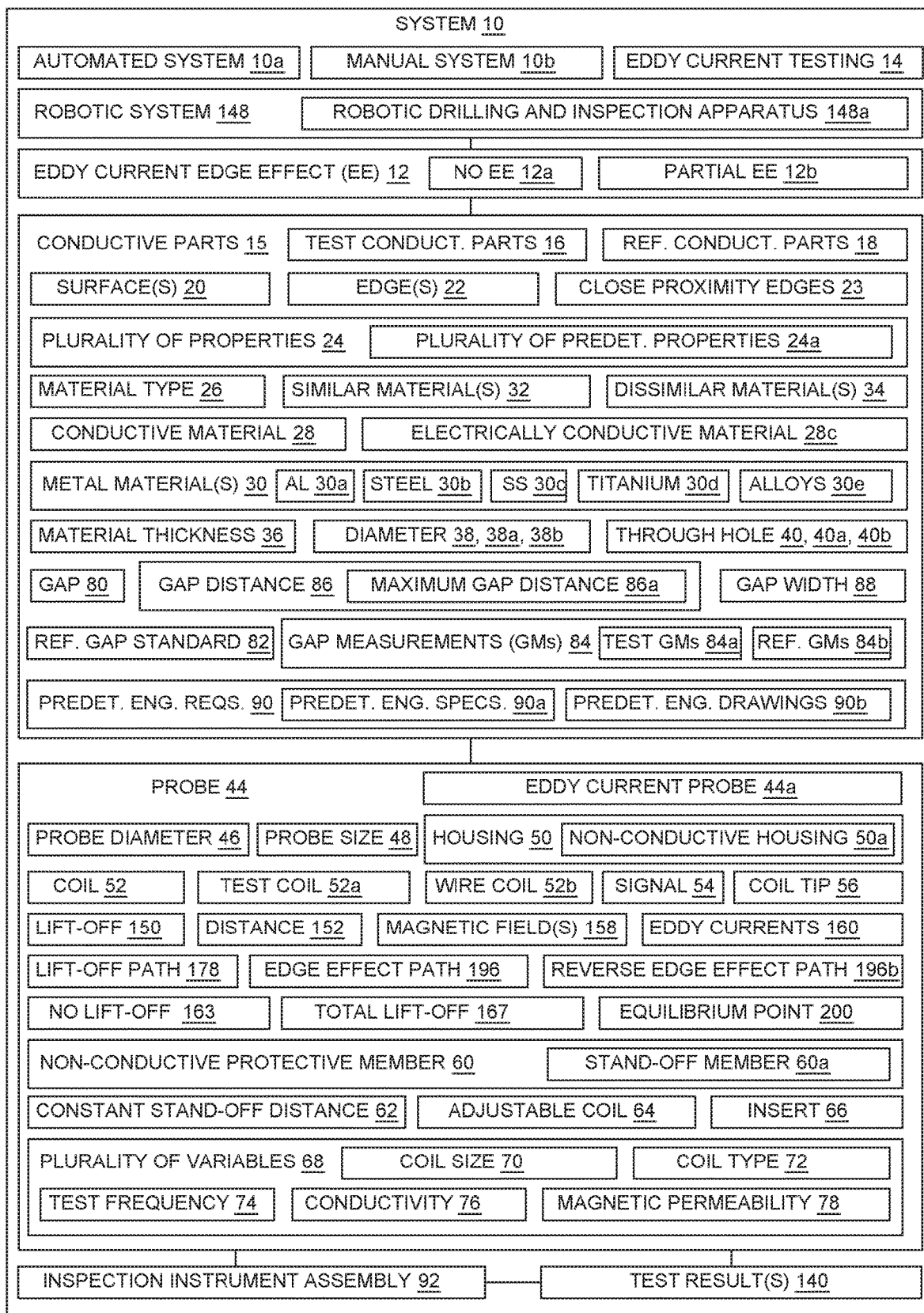
FIG. 1 is an illustration of a block diagram showing an exemplary version of a system of the disclosure.

Now referring to the Figures, FIG. 1 is an illustration of a block diagram showing an exemplary version of a system 10 of the disclosure. In one version, as shown in FIG. 1, there is provided a system 10 using eddy current edge effect 12 to measure a gap 80 between two conductive parts 15, such as in the form of two test conductive parts 16, for example two aircraft conductive parts 17 (see FIG. 8). Eddy current edge effect 12 (see FIG. 1) is a phenomenon that may occur during eddy current testing 14 (see FIG. 1). When a probe 44 (see FIG. 1), such as an eddy current probe 44a (see FIG. 1), approaches an edge 22 (see FIG. 1) of a conductive part 15 (see FIG. 1), such as a test conductive part 16 (see FIG. 1), a magnetic field 158 (see FIG. 1) around a coil 52

(see FIG. 1) within the probe 44 reacts to the edge 22, and this is referred to as "an eddy current edge effect".

As shown in FIG. 1, the system 10 may comprise an automated system 10a. The system 10a, such as the automated system 10a, may be coupled to a robotic system 148 (see FIG. 1) having a robotic drilling and inspection apparatus 148a. Thus, the automated system 10a may be coupled to the robotic drilling and inspection apparatus 148a. The robotic drilling and inspection apparatus 148a may drill through holes 40 (see FIGS. 1, 6) through each of the two conductive parts 15, such as the two test conductive parts 16, to obtained drilled through holes 42 (see FIG. 6). The robotic drilling and inspection apparatus 148a may inspect the drilled through holes 42, and measure the gap 80 between the two conductive parts 15, such as the two test conductive parts 16. If the gap measurement 84 (see FIG. 1), such as a gap width 88 (see FIG. 1), is acceptable, the robotic drilling and inspection apparatus 148a may further fasten the two conductive parts 15, such as the two test conductive parts 16, together with a fastener or rivet.

Although the system 10 may be readily automated to comprise an automated system 10a, the system 10 may also comprise a manual system 10b (see FIG. 1). For example, the system 10 may be portable to perform individual or one-off inspections and measuring of gaps 80 between two conductive parts 15.

As shown in FIG. 1, the system 10 comprises the two conductive parts 15, such as the two test conductive parts 16. The two conductive part 15, such as the two test conductive parts 16, preferably comprise two aircraft conductive parts 17 (see FIGS. 6, 8). As shown in FIG. 1, each of the two conductive parts 15, such as the two test conductive parts 16, for example, the two aircraft conductive parts 17 (see FIGS. 6, 8), have a plurality of properties 24, such as a plurality of predetermined properties 24a, comprising a material type 26, a material thickness 36, and a diameter 38 of the through hole 40 formed through each of the two conductive parts 15, such as the two test conductive parts 16.

Figure 6:
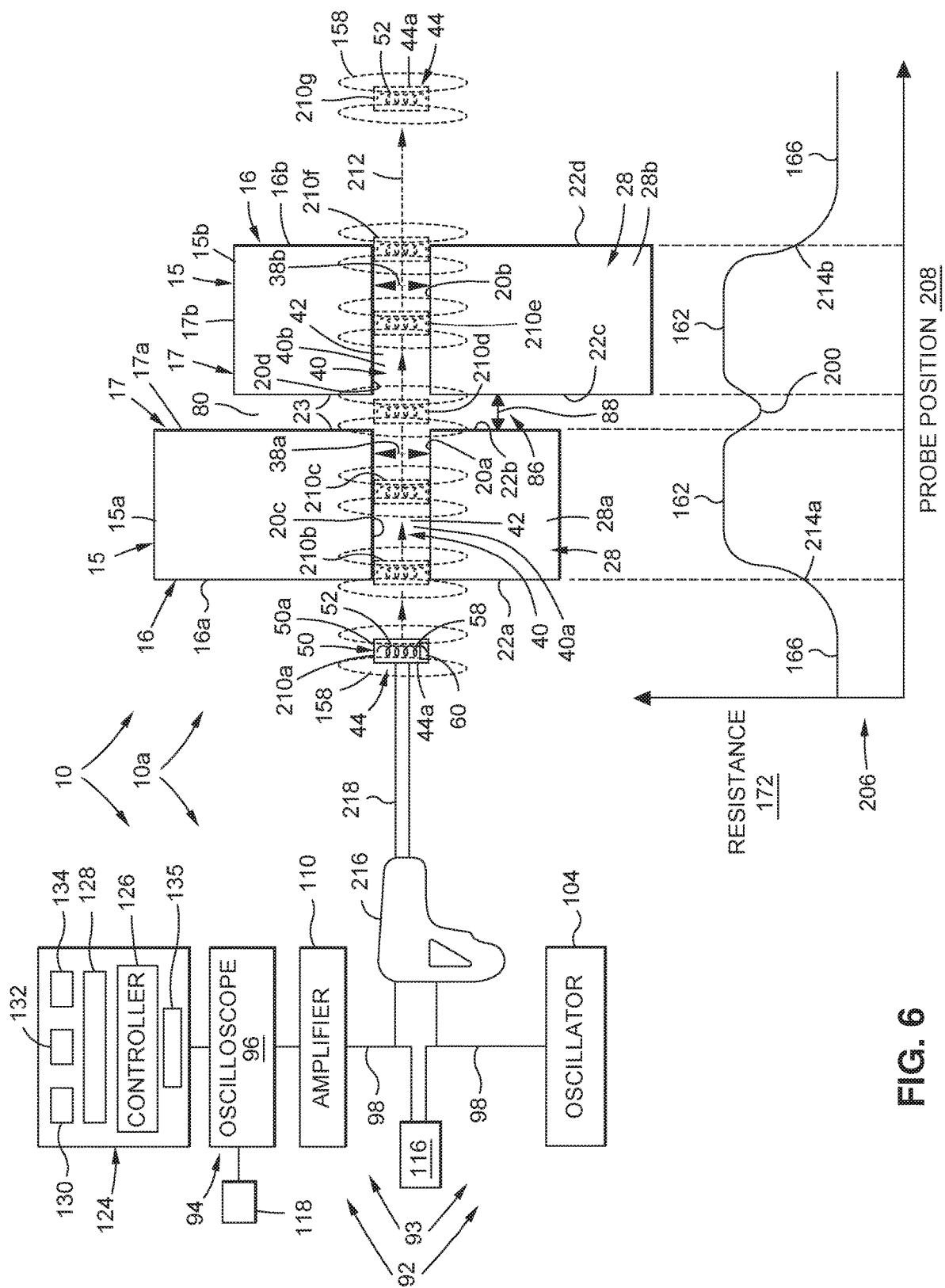
FIG. 6 is a schematic illustration of an exemplary version of a system of the disclosure showing a probe with a coil at various positions in through holes of two conductive parts, with the positions corresponding to a graph showing probe position and resistance.

Preferably, each of the each of the two conductive parts 15, such as the two test conductive parts 16, for example, the two aircraft conductive parts 17 (see FIG. 8), comprise one or more surfaces 20 and at least two edges 22. As shown in FIG. 6, discussed in detail below, the two conductive parts 15, such as the two test conductive parts 16, preferably comprise a first conductive part 15a, such as a first test conductive part 16a, and a second conductive part 15b, such as a second test conductive part 16b. As further shown in FIG. 6, the first conductive part 15a, such as the first test conductive part 16a, for example a first aircraft conductive part 17a, comprises a first surface 20a, a second surface 20c, a first edge 22a, a second edge 22b, and a through hole 40a. As further shown in FIG. 6, the second conductive part 15b, such as the second test conductive part 16b, for example, a second aircraft conductive part 17b, comprises a first surface 20b, a second surface 20d, a first edge 22c, a second edge 22d, and a through hole 40b. The edges 22 (see FIGS. 1, 6), such as the second edge 22b and the first edge 22c, of the two conductive parts 15, such as the two test conductive parts 16, for example, the two aircraft conductive parts 17 (see FIG. 8), are preferably close proximity edges 23 (see FIGS. 1, 6).

Preferably, each of the two conductive parts 15, such as the two test conductive parts 16, for example, the two aircraft conductive parts 17 (see FIG. 8), are made of a conductive material 28 (see FIGS. 1, 6). The first conductive part 15a is made of a conductive material 28 (see FIGS. 1, 6), such as a first conductive part conductive material 28a (see FIG. 6), and the second conductive part 15b is made of a conductive material 28 (see FIGS. 1, 6), such as a second conductive part conductive material 28b (see FIG. 6). The conductive material 28 may comprise an electrically conductive material 28c (see FIG. 1). In addition, the conductive material 28 may comprise non-magnetic materials, and may comprise magnetic or permeable materials. Each of the two conductive parts 15, such as the two test conductive parts 16, for example, the two aircraft conductive parts 17 (see FIG. 8), may comprise similar materials 32 (see FIG. 1), or may comprise dissimilar materials 34 (see FIG. 1). Preferably, each of the two conductive parts 15 comprises similar materials 32. As shown in FIG. 1, the conductive material 28 preferably comprises one or more metal materials 30, such as aluminum (AL) 30a, steel 30b, stainless steel (SS) 30c, titanium 30d, alloys 30e of aluminum 30a, steel 30b, stainless steel 30c, and titanium 30d, or another suitable metal material 30, or electrically conductive material 28.

As shown in FIG. 1, the system 10 further comprises a probe 44. The probe 44 is preferably an eddy current probe 44a (see FIG. 1). As shown in FIG. 1, the probe 44, such as the eddy current probe 44a, has a probe diameter 46 and a probe size 48. The probe 44 comprises a housing 50 (see FIGS. 1, 6) with a coil 52 (see FIGS. 1, 6) mounted within the housing 50. Preferably, the housing 50 is a non-conductive housing 50a (see FIGS. 1, 6). The coil 52 (see FIG. 1) may be in the form of a test coil 52a (see FIG. 1), and may comprise a wire coil 52b (see FIG. 1) made of wire. The coil 52 has a coil tip 56 (see FIG. 1).

The coil 52, such as the test coil 52a, may further comprise a non-conductive protective member 60 (see FIG. 1) coupled to an exterior surface 58 (see FIG. 6) of the coil tip 56 of the coil 52, such as the test coil 52a, to protect the coil 52, including the exterior surface 58 of the coil 52, from wear. The non-conductive protective member 60 may be in the form of a stand-off member 60a (see FIG. 1) that provides a constant stand-off distance 62 (see FIG. 1) between the coil tip 56 of the coil 52, such as the test coil 52a, and the surface 20 (see FIG. 1), for example, the first surface 20a (see FIG. 6) of the first conductive part 15a (see FIG. 6), and the first surface 20b (see FIG. 6) of the second conductive part 15b (see FIG. 6). The non-conductive protective member 60 may comprise a wear face member made of a durable, hard, and non-conductive material, such as aluminum oxide, or another suitable durable, hard, and non-conductive material. The non-conductive protective member 60 directly contacts, or is configured to directly contact, the surface 20 of each of the two conductive parts 15, such as the two test conductive parts 16, for example, the aircraft conductive parts 17, and maintains the constant stand-off distance 62 between the surface 20 and the coil 52, such as the bottom of the coil 52. Preferably, as shown in FIG. 6, the coil 52 or the non-conductive protective member 60 is positioned or held firmly against the conductive material 28 of the conductive parts 15, such as the test conductive parts 16, for example, the aircraft conductive parts 17.

Alternatively, instead of the coil 52 comprising the non-conductive protective member 60 (see FIG. 1), the coil 52 may be in the form of an adjustable coil 64 (see FIG. 1). The adjustable coil 64 may have an insert 66 (see FIG. 1) that may be adjusted or modified to fit within the through hole 40, such as the through hole 40a (see FIGS. 1, 6) of the first conductive part 15a (see FIG. 6), and such as the through hole 40b (see FIGS. 1, 6) of the second conductive part 15b (see FIG. 6).

The probe 44 with the coil 52 contacts, or is configured to contact, the surface 20 of the two conductive parts 15, such as the two test conductive parts 16, for example, the two aircraft conductive parts 17, to take a gap measurement 84 (see FIG. 1), such as a test gap measurement 84a (see FIGS. 1, 2), of a gap distance 86 (see FIGS. 1, 6), for example, a gap width 88 (see FIGS. 1, 6), between the two conductive parts 15. The probe 44 with the coil 52 is preferably selected based on the plurality of predetermined properties 24a (see FIG. 1) of the two conductive parts 15, such as the two test conductive parts 16, to optimize the gap measurement 84, such as the test gap measurement 84a, taken with the probe 44 having the coil 52, and to optimize test performance.

A plurality of variables 68 (see FIG. 1) may be used to optimize the gap measurement 84, such as the test gap measurement 84a. As shown in FIG. 1, the plurality of variables 68 may comprise a coil size 70, such as size and shape, of the coil 52, such as the test coil 52a; a coil type 72, or geometry, design, or dimensions, of the coil 52, such as the test coil 52a; a test frequency 74 such as a frequency 108 (see FIG. 2) of an alternating current 106 (see FIG. 2) in the coil 52, such as the test coil 52a; conductivity 76 of the material type 26 of the two conductive parts 15, such as the two test conductive parts 16, for example, the two aircraft conductive parts 17; magnetic permeability 78 of the material type 25 of the two conductive parts 15, such as the two test conductive parts 16, for example, the two aircraft conductive parts 17; or another suitable variable 68. The coil size 70, the coil type 72, the test frequency 74, the conductivity 76, and the magnetic permeability 78, are all variables 68 that may be optimized for a given situation.

The coil 52 (see FIG. 1) has an interaction 156 (see FIGS. 4B, 5A) between a magnetic field 158 (see FIGS. 1, 4B) around the coil 52 and one or both of the two conductive parts 15 (see FIGS. 1, 4B, 5A), as the coil 52 travels across the gap 80 (see FIGS. 1, 5A) between the two conductive parts 15. The gap 80 between the two conductive parts 15, such as the two test conductive parts 16, preferably has a sufficient gap distance 86 (see FIG. 1) and a sufficient gap width 88 (see FIG. 1) between the two conductive parts 15, to avoid the coil 52, such as the test coil 52a, moving to a total lift-off position 164 (see FIGS. 3B, 4C), at a total lift-off 167 (see FIG. 1), in relation to the two conductive parts 15, such as the two test conductive parts 16, for example, the two aircraft conductive parts 17. The total lift-off position 164 comprises a no interaction 156b (see FIGS. 3B, 4C) between a magnetic field 158 (see FIGS. 1, 3B, 4C) around the coil 52 (see FIGS. 1, 3B, 4C), such as the test coil 52a, and either of the two conductive parts 15, such as the two test conductive parts 16. The gap 80 (see FIG. 1) may comprise a gap 80 between two conductive parts 15 made of similar materials 32 (see FIG. 1), a gap 80 between two conductive parts 15 made of dissimilar materials 34 (see FIG. 1), a gap 80 between an aircraft skin panel and an aircraft stringer, a gap 80 between an aircraft skin panel and an aircraft rib, a gap 80 between overlapping outer and inner aircraft skin panels, a lap splice gap, a gap 80 between skin laps, a gap 80 between multiple stackups, or a gap 80 between other conductive parts 15, such as aircraft conductive parts 17 (see FIG. 8).

As shown in FIG. 1, the system 10 further comprises a reference gap standard 82. The reference gap standard 82 is based on one or more reference gap measurements 84b (see FIG. 1) taken between at least two reference conductive parts 18 (see FIG. 1) separated by a gap distance 86 (see FIG. 1), as specified by predetermined engineering requirements 90 (see FIG. 1). The gap distance 86 (see FIG. 1) may comprise a predetermined gap distance, such as a maximum gap distance 86a (see FIG. 1), for example, an outer gap limit, or the gap distance 86 may comprise another predetermined gap distance. As shown in FIG. 1, the predetermined engineering requirements 90 may comprise predetermined engineering specifications 90a, predetermined engineering drawings 90b, or other suitable predetermined engineering requirements 90. The two reference conductive parts 18 are designed to simulate the two conductive parts 15, such as the two test conductive parts 16, and are preferably standardized with similar materials 32, or the same conductive materials 28.

As shown in FIG. 1, the system 10 further comprises an inspection instrument assembly 92 coupled to the probe 44. The inspection instrument assembly 92 comprises an inspection apparatus 94 (see FIG. 2) calibrated to the probe 44, and calibrated to the reference gap standard 82. Preferably, the inspection apparatus 94 comprises an oscilloscope 96 (see FIG. 2). The oscilloscope 96 may be a digital oscilloscope or an analog oscilloscope. The oscilloscope 96 may display, for example, an impedance plane plot 170 (see FIG. 3C), an impedance plane plot 192 (see FIG. 4D), an impedance plane plot 204 (see FIG. 5B), or another suitable impedance plane plot. The inspection apparatus 94, such as the oscilloscope 96 (see FIG. 2), plots changes in the impedance amplitude and phase angle. The inspection instrument assembly 92 is discussed in further detail below with respect to FIG. 2.

The probe 44 is preferably inserted into the through hole 40 formed through each of the two conductive parts 15, such as the two test conductive parts 16, for example, the aircraft conductive parts 17. The probe 44 with the coil 52 uses the eddy current edge effect 12 to take the gap measurement 84, such as the test gap measurement 84a, and measure the gap 80, such as the gap distance 86, between the two conductive parts 15, such as the two test conductive parts 16, for example, the two aircraft conductive parts 17, to obtain one or more test results 140 (see FIGS. 1, 2). The gap measurement 84, such as the test gap measurement 84a, is compared to the reference gap standard 82, to determine whether the gap measurement 84, such as the test gap measurement 84a, is an acceptable result 142 (see FIG. 2), or an unacceptable result 144, (see FIG. 2), based on the predetermined engineering requirements 90.

Alternating current 106 (see FIG. 2) flowing through the probe 44 (see FIG. 1) and the coil 52 (see FIG. 1) at a chosen frequency 108 (see FIG. 2) generates a magnetic field 158 (see FIGS. 1, 6). When the coil 52 (see FIGS. 1, 6) is positioned close to the conductive part 15, such as the test conductive part 16, for example, the aircraft conductive part 17, eddy current 160 (see FIGS. 1, 3A) is induced in the conductive material 28 (see FIGS. 1, 3A) of the conductive part 15. The magnetic field 158 around the coil 52 reacts to the edge 22 (see FIGS. 1, 4B, 5A, 6) of the conductive part 15, such as the test conductive part 16, for example, the aircraft conductive part 17, since the conductive material 28 may be an electrically conductive material 28c (see FIG. 1). In addition, with eddy current edge effect 12 (see FIG. 1), the eddy currents 160 cannot flow past the edge 22 of the conductive part 15, which distorts the eddy current field in order to comply with the edge 22.

When the edge 22 (see FIGS. 5A, 6), such as the second edge 22b (see FIGS. 5A, 6), of the first conductive part 15a (see FIGS. 5A, 6), is in close proximity to another edge 22 (see FIGS. 6A, 6), such as the first edge 22c (see FIGS. 5A, 6) of the second conductive part 15b (see FIGS. 5A, 6), then as the magnetic field 158 is moved closer to the second edge 22b of the first conductive part 15a, the magnetic field 158 begins to react with the first edge 22c of the second conductive part 15b. This reaction may be plotted or charted with the inspection apparatus 94 (see FIG. 2), such as the oscilloscope (see FIG. 2), and from that plot or chart, the gap measurement 84 (see FIG. 1), such as the gap distance 86 (see FIGS. 1, 6), for example, the gap width 88 (see FIGS. 1, 6), may be determined.

The coil 52, such as the test coil 52a, reaches an equilibrium point 200 (see FIG. 1), when the probe 44 with the coil 52, such as the test coil 52a, is centered over the gap 80 between the two conductive parts 15, such as the two test conductive parts 16, for example, the two aircraft conductive parts 17. The equilibrium point 200 is used to determine the gap measurement 84, such as the test gap measurement 84a, comprising the gap width 88. The equilibrium point 200 is where an edge effect path 196 (see FIG. 1), such as an edge effect path 196a (see FIG. 5B), begins to reverse itself to become a reverse edge effect path 196b (see FIGS. 1, 5B).

Figure 2:
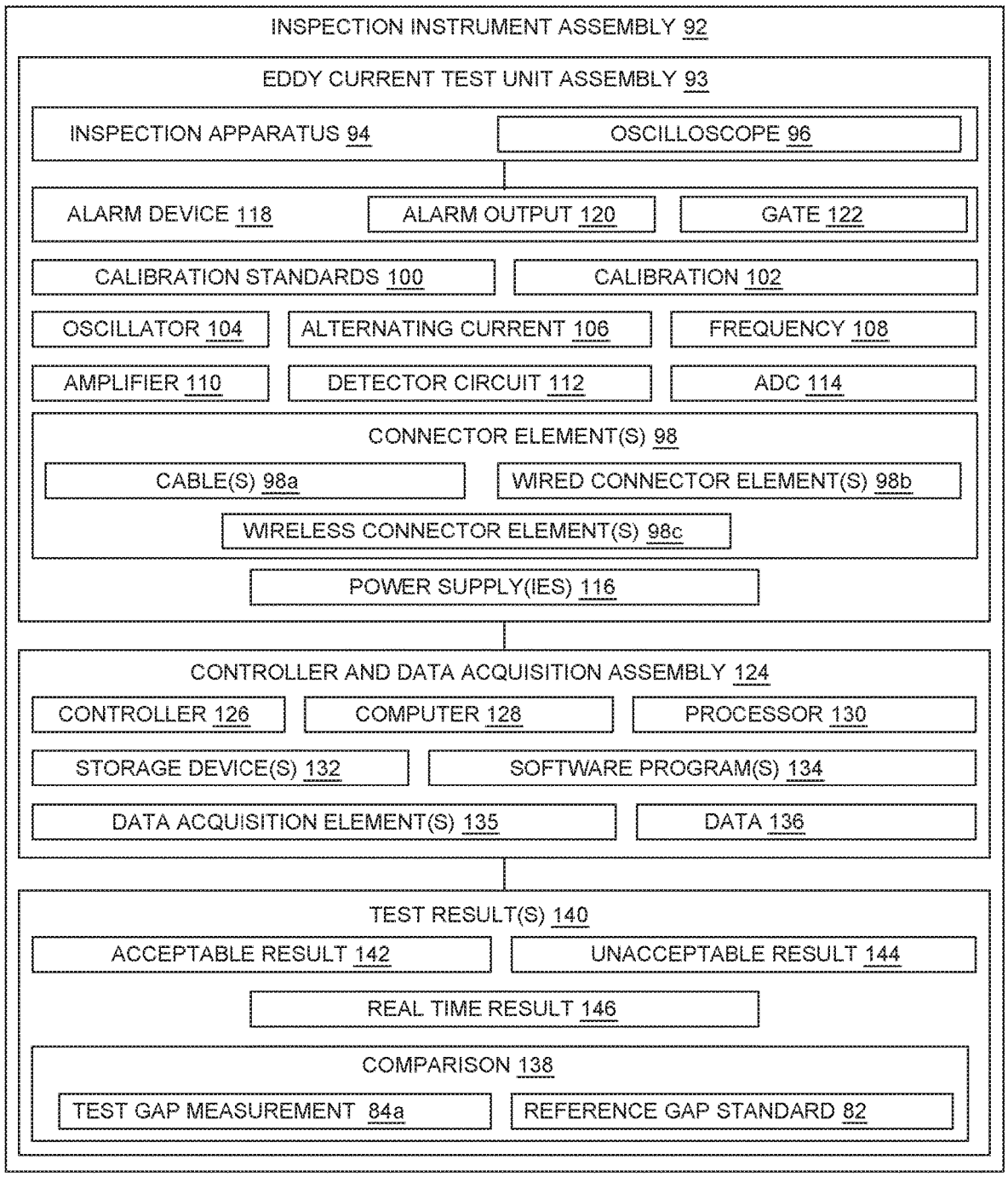
FIG. 2 is an illustration of a block diagram showing an exemplary version of an inspection instrument assembly used in the system of the disclosure.

Now referring to FIG. 2, FIG. 2 is an illustration of a block diagram showing an exemplary version of an inspection instrument assembly 92 used in the system 10, such as the automated system 10a, of the disclosure. As shown in FIG. 2, the inspection instrument assembly 92 may be in the form of an eddy current test unit assembly 93. As further shown in FIG. 2, the inspection instrument assembly 92 comprises the inspection apparatus 94, such as the oscilloscope 96, discussed above. The inspection apparatus 94, such as the oscilloscope 96, may be coupled to an alarm device 118 (see FIG. 2). The alarm device 118 may be activated or triggered when the gap measurement 84, such as the test gap measurement 84a, that is taken, is the unacceptable result 144. The alarm device 118 delivers or releases an alarm output 120 (see FIG. 2). The alarm output 120 may comprise a signal such as a light signal, a sound, a locking mechanism, or another type of alarm output 120. The alarm device 118 may further include a gate 122 (see FIG. 2) to notify a user when the gap measurement 84 is outside a range of specified values, based on the predetermined engineering requirements 90. The inspection apparatus 94, such as the oscilloscope 96, is calibrated to the probe 44 and is calibrated to the reference gap standard 82 using calibration standards 100 (see FIG. 2) for calibration 102 (see FIG. 2). The system 10 (see FIG. 1) may be readily automated, including calibration 102.

As shown in FIG. 2, the inspection instrument assembly 92 may further comprise one or more of, an oscillator 104, an amplifier 110, a detector circuit 112, and an analog-to-digital converter (ADC) 114. An alternating current (AC) 106 (see FIG. 2) flows through the coil 52, such as the test coil 52a, of the probe 44, and generates the magnetic field 158 that oscillates. The oscilloscope 96 may display the alternating current 106, and the alternating current 106 has a frequency 108 (see FIG. 2). The oscillator 104 inputs the signal 54 (see FIG. 1) and the alternating current (AC) 106 to the probe 44 and the coil 52. The amplifier 110 (see FIG. 2), the oscilloscope 96 (see FIG. 2), and a controller and data acquisition assembly 124 (see FIG. 2) receive the output of the signal 54 (see FIG. 1) from the probe 44 and the coil 52. The detector circuit 112 (see FIG. 2) may include a signal processing circuit, or other suitable circuit elements.

As shown in FIG. 2, the inspection instrument assembly 92 further comprises one or more power supplies 116. The one or more power supplies 116 may comprise batteries, electricity, or other power supply elements. As shown in FIG. 2, the inspection instrument assembly 92 further comprises one or more connector elements 98. As further shown in FIG. 2, the one or more connector elements 98 may comprise one or more cables 98a, one or more wired connector elements 98b, one or more wireless connector element 98c, or other suitable connector elements 98 to connect the various components of the inspection instrument assembly 92 to each other and to the probe 44.

As shown in FIG. 2, the inspection instrument assembly 92 further comprises a controller and data acquisition assembly 124. As shown in FIG. 2, the controller and data acquisition assembly 124 may comprise a controller 126 that controls, or is configured to control, various components of the inspection instrument assembly 92 and the probe 44. As further shown in FIG. 2, the controller and data acquisition assembly 124 may comprise a computer 128, a processor 130, one or more storage devices 132, one or more software programs 134, and one or more data acquisition elements 135. The controller and data acquisition assembly 124a controls the system 10, and preferably collects, processes, analyzes, and displays data 136 (see FIG. 2) based on output of the signals 54 from the probe 44 and the coil 52. The data 136 (see FIG. 2) may be produced instantaneously and immediately, and the data 136 may be evaluated by a technician or user, or automated to report non-conformities. The computer 128 (see FIG. 2) may include one or more processor 130 (see FIG. 2), and may further include an operating system. The computer 128 controls, or is configured to control, one or more functions through one or more software programs 134, stored on one or more storage devices 132, such as computer memory and persistent storage. The computer memory may comprise one or more of a random access memory (RAM), including dynamic and/or static RAM, on-chip or off-chip cache memory, or other suitable computer memory. The persistent storage may comprise one or more of a flash memory, a hard drive, Read-Only Memory (ROM), magnetic storage devices such as hard disks, floppy disk drives, and rewritable magnetic tape, rewritable optical disk drives and/or media, non-volatile random access memory (NVRAM), or other suitable persistent storage. In addition, the computer 128 may have one or more input/output units that provide for the input and output of the data 136, such as a keyboard, a mouse, a joystick, or other input/output devices. The one or more software programs 134 may comprise a system logic, an algorithm, a set of instructions, or another suitable software program 134.

As further shown in FIG. 2, the one or more test results 140 that are obtained with the system 10 (see FIG. 1), include an acceptable result 142, or an unacceptable result 144. The test result 140 is a real time result 146 (see FIG. 2) that may be obtained instantaneously and immediately. A comparison 138 (see FIG. 2) of the gap measurement 84, such as the test gap measurement 84a (see FIG. 2), to the reference gap standard 82 (see FIG. 2), is made to determine whether the gap measurement 84, such as the test gap measurement 84a, is the acceptable result 142 (see FIG. 2), or the unacceptable result 144, (see FIG. 2), based on the predetermined engineering requirements 90, for example, a "go" or a "no go" result.

The inspection instrument assembly 92 (see FIG. 2), such as the eddy current test unit assembly 93 (see FIG. 2), is one exemplary assembly that may be used with the system 10 and method 250 disclosed herein. However, another suitable inspection instrument assembly 92 (see FIG. 2), such as another suitable eddy current test unit assembly 93 (see FIG. 2), may also be used.

Figure 8:
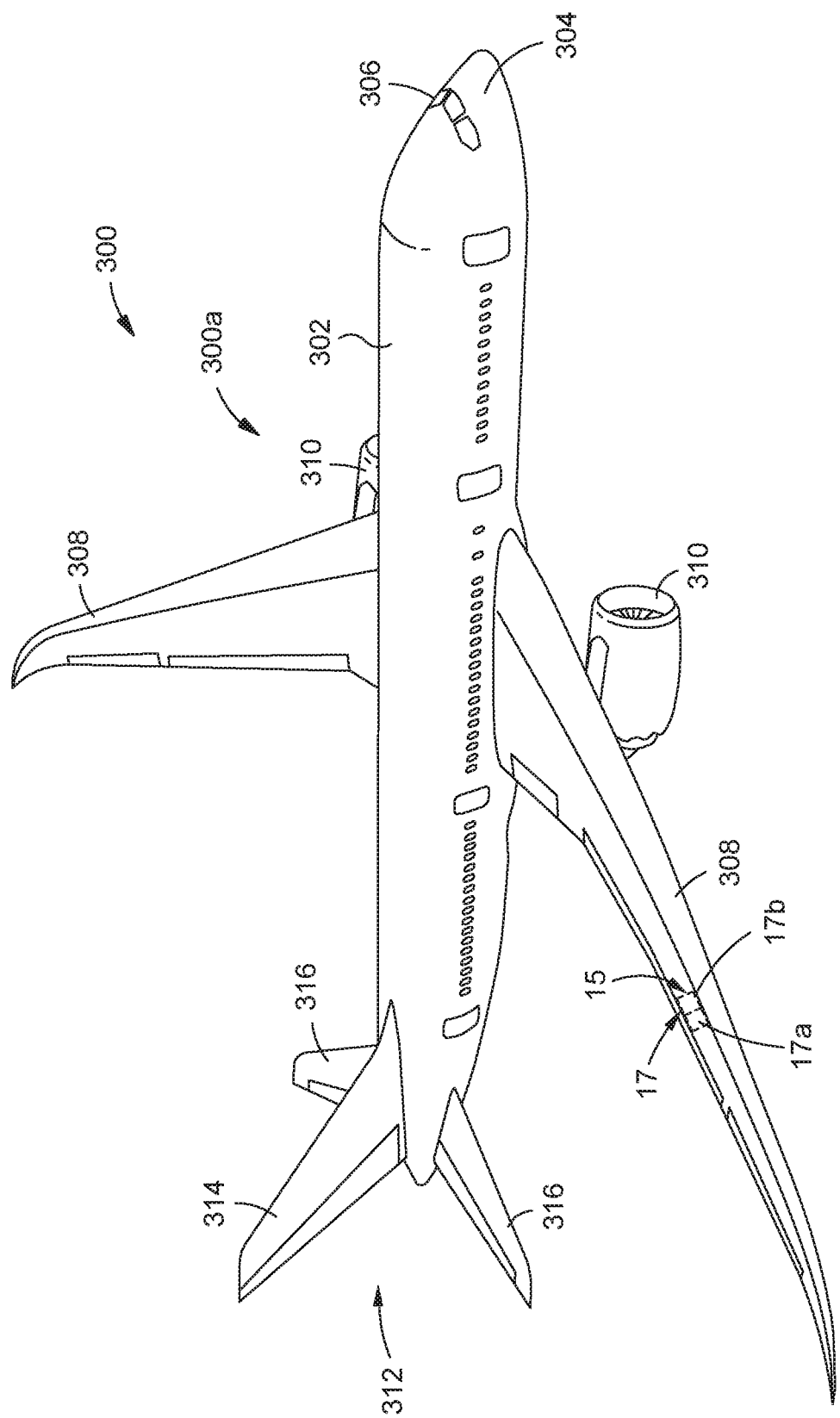
FIG. 8 is an illustration of a perspective view of an aircraft that incorporates aircraft conductive parts that may be measured using an exemplary version of a system and a method of the disclosure.

With the version of the disclosure directed to the automated system 10a (see FIGS. 1, 6), the automated system 10 uses eddy current edge effect 12 (see FIG. 1) to measure the gap 80 (see FIGS. 1, 6) between two aircraft conductive parts 17 (see FIG. 8). The automated system 10a comprises two aircraft conductive parts 17, each having the plurality of predetermined properties 24a (see FIG. 1) comprising the material type 26 (see FIG. 1), the material thickness 36 (see FIG. 1), and the diameter 38 (see FIG. 1) of the through hole 40 (see FIG. 1) formed through each of the two aircraft conductive parts 17. The automated system 10a further comprises the eddy current probe 44a (see FIG. 1) comprising the housing 50 (see FIGS. 1, 6) with the coil 52 (see FIG. 1) mounted within the housing 50. The coil 52 may further comprise the non-conductive protective member 60 (see FIGS. 1, 6) coupled to the coil 52, to protect the coil 52 from wear. The non-conductive protective member 60 (see FIG. 6) may contact the first surface 20a (see FIG. 6) of the through hole 40a (see FIG. 6) of the first conductive part 15a (see FIG. 6), and may contact the first surface 20b (see FIG. 6) of the through hole 40b (see FIG. 6) of the second conductive part 15b. The non-conductive protective member 60 preferably maintains the constant stand-off distance 62 (see FIG. 1) between the first surface 20a (see FIG. 6) of the first conductive part 15a (see FIG. 6) and the coil 52, and the first surface 20b (see FIG. 6) of the second conductive part 15b and the coil 52. The eddy current probe 44a is configured to contact the two aircraft conductive parts 17 to take the gap measurement 84 (see FIG. 1) comprising the gap width 88 (see FIG. 1) of the gap 80 between the two aircraft conductive parts 17. The plurality of variables 68 (see FIG. 1) used to optimize the gap measurement 84 comprise the coil size 70 (see FIG. 1), the coil type 72 (see FIG. 1), the test frequency 74 (see FIG. 1), conductivity 76 (see FIG. 1) of the two aircraft conductive parts 17, and magnetic permeability 78 (see FIG. 1) of the two aircraft conductive parts 17.

The automated system 10a (see FIG. 1) further comprises the reference gap standard 82 (see FIG. 1), based on the one or more reference gap measurements 84b (see FIG. 1), taken between at least two reference conductive parts 18 (see FIG. 1) separated by the gap distance 86 (see FIG. 1), as specified by the predetermined engineering requirements 90 (see FIG. 1). The automated system 10a further comprises the inspection instrument assembly 92 (see FIGS. 1, 2) coupled to the eddy current probe 44a. The inspection instrument assembly 92, as discussed above, comprises the oscilloscope 96 (see FIG. 2) calibrated to the eddy current probe 44a, and calibrated to the reference gap standard 82, and comprises the alarm device 118 (see FIG. 2) coupled to the oscilloscope 96. As discussed above and as shown in FIG. 2, the inspection instrument assembly 92 may further comprise one or more of, the oscillator 104, the amplifier 110, the detector circuit 112, the ADC 114, one or more power supplies 116, one or more connector elements 98, and the controller and data acquisition assembly 124.

With the automated system 10a, the eddy current probe 44a is inserted into the through hole 40 formed through each of the two aircraft conductive parts 17, and the eddy current probe 44a with the coil 52 uses the eddy current edge effect 12 to take the gap measurement 84 comprising the gap width 88, and measure the gap 80 between the two aircraft conductive parts 17. The gap measurement 84 is compared to the reference gap standard 82, to determine whether the gap measurement 84 is an acceptable result 142 (see FIG. 2) or an unacceptable result 144 (see FIG. 2), based on the predetermined engineering requirements 90 (see FIG. 1). The alarm device 118 is activated when the gap measurement 84 that is taken is the unacceptable result 144. When the eddy current probe 44a with the coil 52 is centered over the gap 80 (see FIGS. 1, 6) between the two aircraft conductive parts 17, it reaches the equilibrium point 200 (see FIGS. 1, 6). The equilibrium point 200 is used to determine the gap measurement 84 comprising the gap width 88 (see FIGS. 1, 6). The gap 80 between the two aircraft conductive parts 17 preferably has a sufficient gap distance 86 (see FIG. 1) and a sufficient gap width 88 (see FIG. 1) between the two aircraft conductive parts 17, to avoid the coil 52, such as the test coil 52a, moving to the total lift-off position 164 (see FIG. 3B) in relation to the two aircraft conductive parts 17. The total lift-off position 164 comprises a no interaction 156b (see FIG. 3B) between the magnetic field 158 around the coil 52 and either of the two aircraft conductive parts 17.

The automated system 10a is coupled to the robotic drilling and inspection apparatus 148a (see FIG. 1) of the robotic system 148 (see FIG. 1). The through hole 40 (see FIG. 1) formed through each of the two aircraft conductive parts 17 is a preferably a drilled through hole 42 (see FIG. 1), which is drilled by the robotic drilling and inspection apparatus 148a.

Figure 3A:
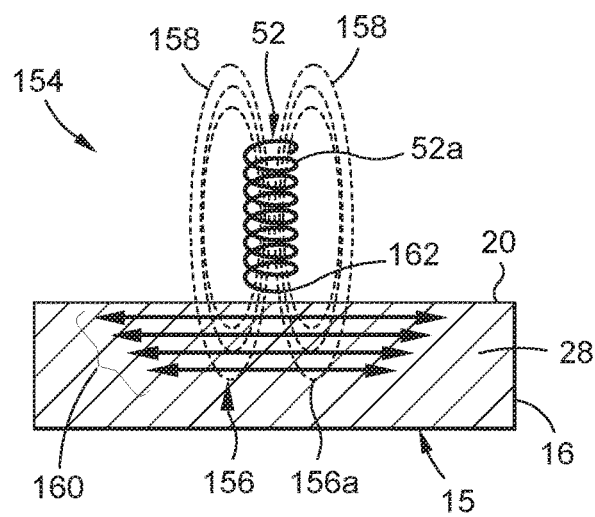
FIG. 3A is a schematic illustration of a front view of a coil in a no lift-off position on a conductive part.

Now referring to FIG. 3A, FIG. 3A is a schematic illustration of a front view of a coil 52, such as a test coil 52a, having a magnetic field 158, in a no lift-off position 154 on a surface 20 of a conductive part 15, such as a test conductive part 16, made of a conductive material 28, such as an electrically conductive material 28c (see FIG. 1). The conductive material 28 may also comprise non-magnetic materials, and may also comprise magnetic or permeable materials. Lift-off 150 (see FIG. 1) in eddy current testing 14 (see FIG. 1) is a term used for a variation in a distance 152 (see FIG. 1) between the coil 52 (see FIGS. 1, 3A), such as the test coil 52a (see FIGS. 1, 3A), and the conductive material 28 (see FIGS. 1, 3A) of the conductive part 15 (see FIGS. 1, 3A), such as the test conductive part 16 (see FIGS. 1, 3A), being tested. Lift-off 150 has been used for measuring the thickness of non-conductive coatings over a conductive material.

As shown in FIG. 3A, when the coil 52, such as the test coil 52a, is in the no lift-off position 154, there is an interaction 156, such as a maximum interaction 156a, between the magnetic field 158 and the conductive part 15, such as the test conductive part 16, and there is a no lift-off 163 (see FIG. 1) configuration or state. An alternating current 106 (see FIG. 2) flows through the coil 52, such as the test coil 52a, and generates the magnetic field 158 that oscillates. With the coil 52, such as the test coil 52a, and its magnetic field 158 in the maximum interaction 156a with the conductive part 15, such as the test conductive part 16, eddy currents 160 (see FIG. 3A) circulate through the conductive part 15, such as the test conductive part 16. The eddy currents 160 flowing through the conductive part 15, such as the test conductive part 16, also generate a magnetic field which interacts with the coil 52 and the magnetic field 158 through mutual inductance. FIG. 3A shows the coil 52, such as the test coil 52a, at a no lift-off point 162. Decreasing the lift-off 150 (see FIG. 1), increases the signal 54 (see FIG. 1) of the coil 52 and the probe 44 because the magnetic field 158 interacts more with the conductive material 28 of the conductive part 15.

Figure 3B:
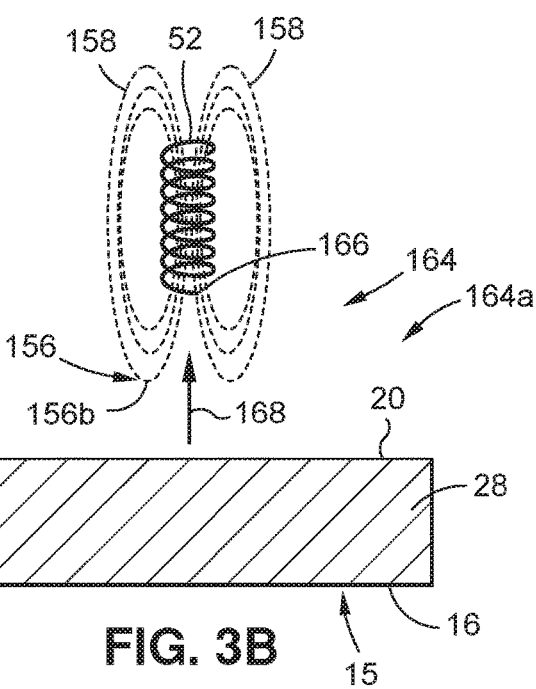
FIG. 3B is a schematic illustration of a front view of the coil of FIG. 3A, in a total lift-off position above the conductive part.

Now referring to FIG. 3B, FIG. 3B is a schematic illustration of a front view of the coil 52 of FIG. 3A, in a total lift-off position 164, such as a total vertical lift-off position 164a, lifted in a lift-off direction 168, above the surface 20 of the conductive part 15, such as the test conductive part 16. As shown in FIG. 3B, when the coil 52 is in the total lift-off position 164, the interaction 156 comprises a no interaction 156b between the magnetic field 158 and the conductive part 15, such as the test conductive part 16. FIG. 3B shows the coil 52 at a total lift-off point 166. Increasing the lift-off 150 (see FIG. 1), decreases the signal 54 (see FIG. 1) of the coil 52 and the probe 44 because the magnetic field 158 interacts less with the conductive material 28 of the conductive part 15.

Figure 3C:
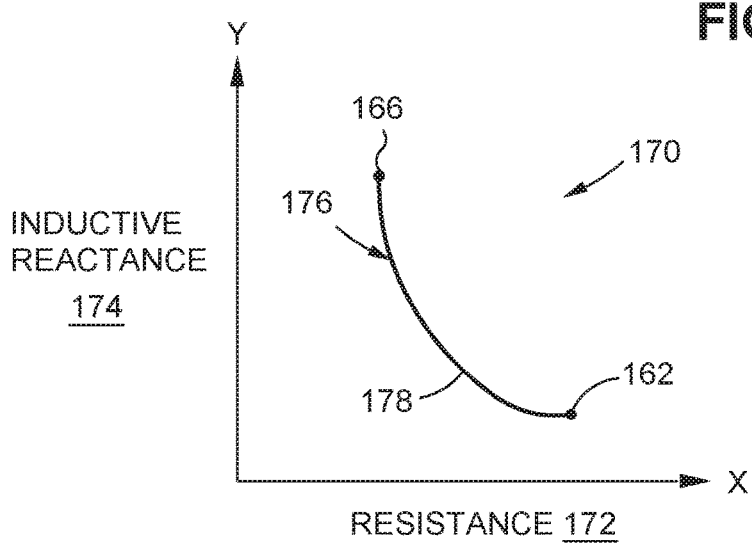
FIG. 3C is an illustration of an impedance plane plot that plots resistance and inductive reactance of a lift-off path.

Now referring to FIG. 3C, FIG. 3C is an illustration of an impedance plane plot 170 that plots or charts a resistance 172, or a coil resistance, on the x-axis, and an inductive reactance 174 on the y-axis, of a lift-off path 178. The resistance 172 is measured in ohms. The inductive reactance 174 is the frequency 108 (see FIG. 2) of the alternating current 106 (see FIG. 2) in hertz, and the inductance of the coil 52 in henrys (calculated as 2*pi*(F)(frequency)*(L) (henrys) or $2\pi FL$). As shown in FIG. 3C, the impedance plane plot 170 shows the no lift-off point 162, the total lift-off point 166, and a trace 176 comprising a lift-off path 178 (see also FIG. 1), formed as a curve between the no lift-off point 162 and the total lift-off point 166. When the coil 52 is moved away from the surface 20 of the conductive part 15, such as the test conductive part 16, the interaction 156 between the magnetic field 158, in its entirety, and the conductive material 28 of the conductive part 15 decreases, causing a change in the resistance 172.

The impedance plane plot may include a trace 176 (see FIGS. 3C, 4D, 5B), such as a lift-off path 178 (see FIG. 3C), a lift-off path 178a (see FIG. 4D), a lift-off path 178b (see FIG. 5B), or another suitable lift-off path of a signal 54 (see FIG. 1) of the probe 44, plotted or charted during taking of the gap measurement 84 and measurement of the gap 80 between the two conductive parts 15, such as the test conductive parts 16. The impedance plane plot may further include a trace 194 (see FIGS. 4D, 5B), such as an edge effect path 196 (see FIG. 4D), an edge effect path 196a (see FIG. 5B), a reverse edge effect path 196b (see FIG. 5B), or another suitable edge effect path of the signal 54 of the probe 44, plotted or charted during taking of the gap measurement 84 and measurement of the gap 80 between the two conductive parts 15, such as the test conductive parts 16.

Figure 4A:
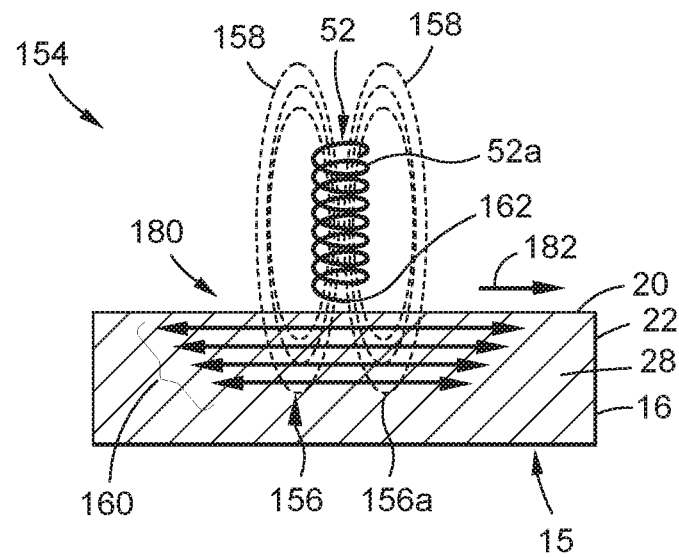
FIG. 4A is a schematic illustration of a front view of a coil in a no lift-off position and in a no edge effect position on a conductive part.

Now referring to FIG. 4A, FIG. 4A is a schematic illustration of a front view of a coil 52, such as a test coil 52a, in the no lift-off position 154 and in a no edge effect position 180, on the surface 20 of the conductive part 15, such as the test conductive part 16, made of a conductive material 28, such as an electrically conductive material 28c (see FIG. 1). The conductive material 28 may also comprise non-magnetic materials, and may also comprise magnetic or permeable materials. As shown in FIG. 4A, when the coil 52, such as the test coil 52a, is in the no lift-off position 154, there is interaction 156, such as the maximum interaction 156a, between the magnetic field 158 and the conductive part 15, such as the test conductive part 16. FIG. 4A shows eddy currents 160 through the conductive part 15, such as the test conductive part 16. FIG. 4A shows the coil 52, such as the test coil 52a, at the no lift-off point 162. When the coil 52 is in the no lift-off position 154 and in the no edge effect position 180, the coil 52 has a no lift-off 163 (see FIG. 1) and a no edge effect 12a (see FIG. 1) configuration. As shown in FIG. 4A, the coil 52 is configured to move laterally toward an edge 22 in a direction 182.

Figure 4B:
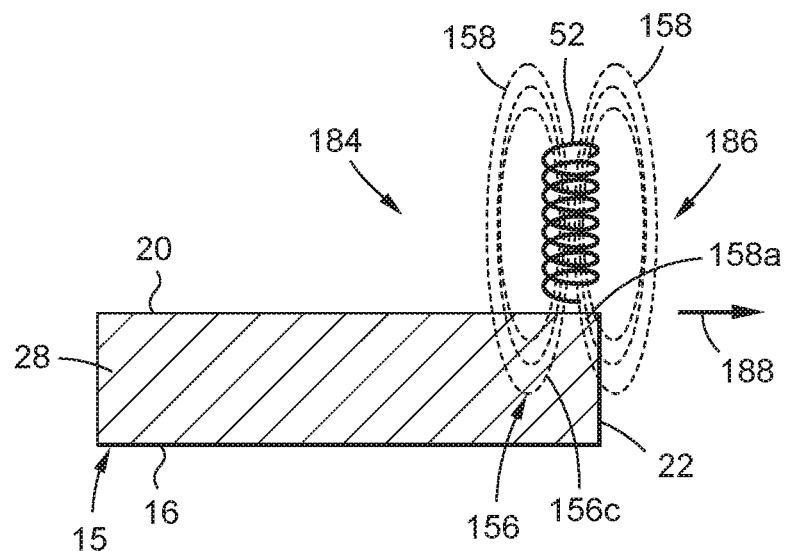
FIG. 4B is a schematic illustration of a front view of the coil of FIG. 4A, in a partial lift-off position and in a partial edge effect position on the conductive part.

Now referring to FIG. 4B, FIG. 4B is a schematic illustration of a front view of the coil 52 of FIG. 4A, in a partial lift-off position 184 and in a partial edge effect position 186 on the conductive part 15, such as the test conductive part 16. The coil 52 in the partial edge effect position 186 (see FIG. 4B) has a partial edge effect 12b (see FIG. 1), which means there is interaction 156 (see FIG. 4B) comprising a partial interaction 156c (see FIG. 4B) between a portion 158a (see FIG. 4B) of the magnetic field 158 (see FIG. 4B) and the conductive material 28 (see FIG. 4B) of the conductive part 15 (see FIG. 4B), such as the test conductive part 16 (see FIG. 4B). As shown in FIG. 4B, when the coil 52 is moved toward the edge 22 of the conductive part 15, such as the test conductive part 16, in a direction 188, the partial interaction 156c between the portion 158a of the magnetic field 158 and the conductive material 28 of the conductive part 15, such as the test conductive part 16, decreases. This causes a change in the resistance 172 (see FIG. 4D). Because the partial interaction 156c is not equal at all points within the magnetic field 158, an edge effect path 196 (see FIG. 4D) from the no lift-off point 162 (see FIGS. 4A, 4D) to the total lift-off point 166 (see FIGS. 4C, 4D) changes. This is the eddy current edge effect 12 (see FIG. 1). As the coil 52 is moved off the conductive part 15, such as the test conductive part 16, it will eventually reach the total lift-off point 166 (see FIG. 4C).

Figure 4C:
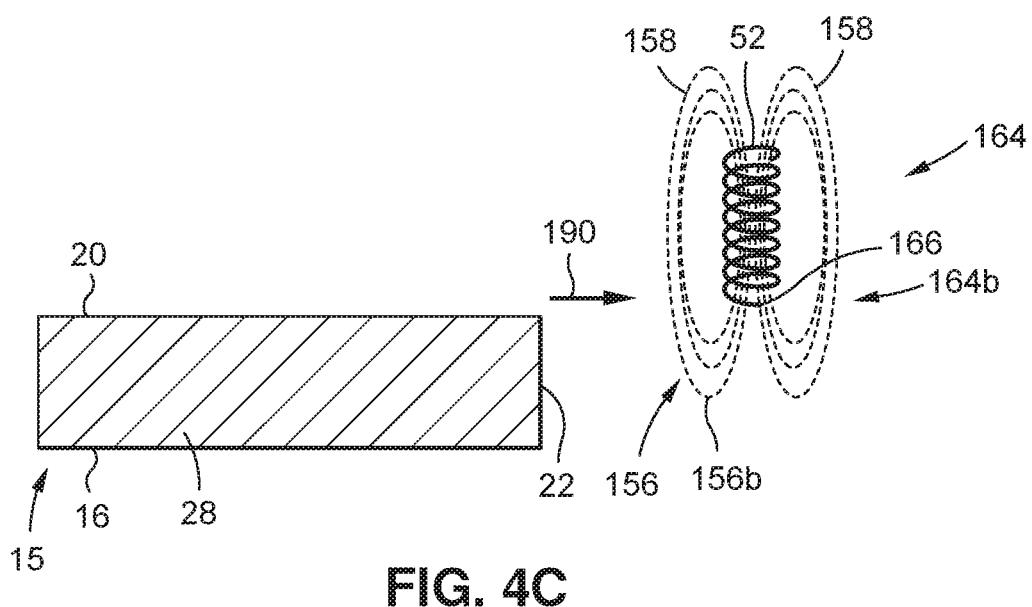
FIG. 4C is a schematic illustration of a front view of the coil of FIG. 4A, in a total lift-off position lateral to the conductive part.

Now referring to FIG. 4C, FIG. 4C is a schematic illustration of a front view of the coil 52 of FIG. 4A, in the total lift-off position 164, such as a total horizontal lift-off position 164b, moved laterally in a lift-off direction 190, past the edge 22 of the conductive part 15, such as the test conductive part 16, and off the surface 20 of the conductive part 15, such as the test conductive part 16. As shown in FIG. 4C, when the coil 52 is in the total lift-off position 164, the interaction 156 comprises a no interaction 156b between the magnetic field 158 and the conductive material 28 of the conductive part 15, such as the test conductive part 16. FIG. 4C shows the coil 52 at the total lift-off point 166.

Figure 4D:
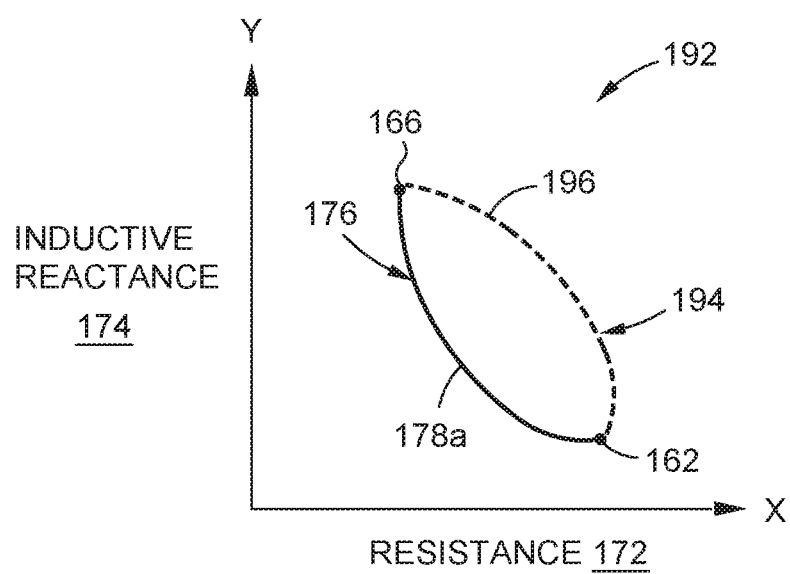
FIG. 4D is an illustration of an impedance plane plot that plots resistance and inductive reactance of a lift-off path and an edge effect path.

Now referring to FIG. 4D, FIG. 4D is an illustration of an impedance plane plot 192 that plots or charts the resistance 172, or coil resistance, on the x-axis, and the inductive reactance 174 on the y-axis, of a lift-off path 178a and of an edge effect path 196. The resistance 172 is measured in ohms. The inductive reactance 174 is the frequency of the alternating current 106 (see FIG. 2) in hertz, and the inductance of the coil 52 in henrys. As shown in FIG. 4D, the impedance plane plot 192 shows the no lift-off point 162, the total lift-off point 166, and the trace 176 comprising the lift-off path 178a, formed as a curve between the no lift-off point 162 and the total lift-off point 166. As further shown in FIG. 4D, the impedance plane plot 192 shows a trace 194 comprising the edge effect path 196, formed as another curve between the no lift-off point 162 and the total lift-off point 166. Because the interaction 156 (see FIG. 4B) is a partial interaction 156c (see FIG. 4B), and is not equal at all points within the magnetic field 158, the edge effect path 196 (see FIGS. 1, 4D) from the no lift-off point 162 (see FIG. 4D) to the total lift-off point 166 (see FIG. 4D) changes, and there is the eddy current edge effect 12 (see FIG. 1).

Figure 5A:
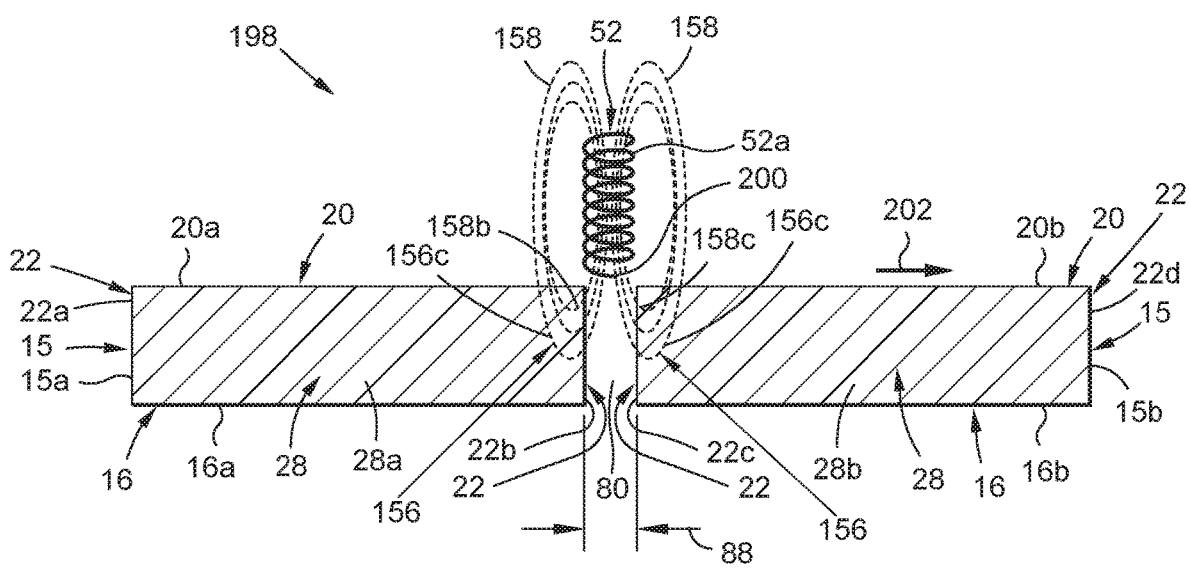
FIG. 5A is schematic illustration of a front view of a coil in an equilibrium position centered over a gap between two conductive parts.

Now referring to FIG. 5A, FIG. 5A is schematic illustration of a front view of a coil 52, such as a test coil 52a, in an equilibrium position 198 centered over a gap 80 between two conductive parts 15, such as two test conductive parts 16, each made of a conductive material 28, such as an electrically conductive material 28c (see FIG. 1). The conductive material 28 may also comprise non-magnetic materials, and may also comprise magnetic or permeable materials. As shown in FIG. 5A, the two conductive parts 15, such as the two test conductive parts 16, comprise a first conductive part 15a, such as a first test conductive part 16a, and a second conductive part 15b, such as a second test conductive part 16b. As further shown in FIG. 5A, the first conductive part 15a has a surface 20, such as a first surface 20*a*, and has edges 22, such as a first edge 22*a* and a second edge 22*b*. The first conductive part 15*a* is made of a conductive material 28, such as a first conductive part conductive material 28*a*. As further shown in FIG. 5A, the second conductive part 15*b* has a surface 20, such as a first surface 20*b*, and has edges 22, such as a first edge 22*c* and a second edge 22*d*. The second conductive part 15*b* is made of a conductive material 28, such as a second conductive part conductive material 28*b*. Preferably, the first conductive part conductive material 28*a* and the second conductive part conductive material 28*b* are similar materials 32 (see FIG. 1). As shown in FIG. 5A, the coil 52 may move laterally in a direction 202 across the first surface 20*a* of the first conductive part 15*a*, to the first surface 20*b* of the second conductive part 15*b*. When the second conductive part conductive material 28*b* of the second conductive part 15*b* is a similar material and near the second edge 22*b* (see FIG. 5A) of the first conductive part conductive material 28*a* of the first conductive part 15*a*, then moving the coil 52 towards it will cause the magnetic field 158 to begin interacting with the second conductive part conductive material 28*b* of the second conductive part 15*b*, which, in turn, reverses an edge effect path 196*a* (see FIG. 5B) back toward the no lift-off point 162 (see FIG. 5B). However, the first conductive part conductive material 28*a* and the second conductive part conductive material 28*b* may also comprise dissimilar materials 34 (see FIG. 1).

FIG. 5A shows the coil 52 centered over the gap 80, which is the equilibrium point 200. When the coil 52, such as the test coil 52*a*, is in the equilibrium position 198, at the equilibrium point 200, there is partial interaction 156*c* between a portion 158*b* of the magnetic field 158 and the first conductive part 15*a*, and there is partial interaction 156*c* between a portion 158*c* of the magnetic field 158 and the second conductive part 15*b*. FIG. 5A further shows the gap 80 having a gap width 88. The gap 80 between the two conductive parts 15, such as the two test conductive parts 16, preferably has a sufficient gap distance 86 (see FIG. 1) and a sufficient gap width 88 (see FIG. 1) between the two conductive parts 15, to avoid the coil 52, such as the test coil 52*a*, moving to the total lift-off position 164 (see FIGS. 3B, 4C), at the total lift-off 167 (see FIG. 1), in relation to the two conductive parts 15, such as the two test conductive parts 16.

Figure 5B:
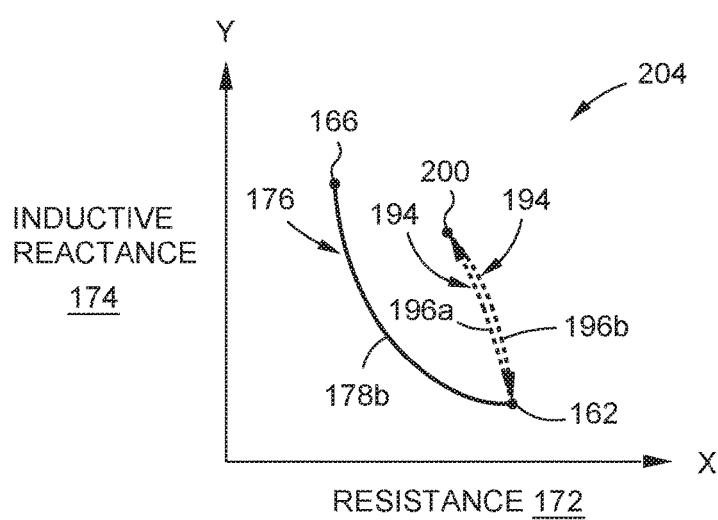
FIG. 5B is an illustration of an impedance plane plot that plots resistance and inductive reactance of a lift-off path, an edge effect path, a reverse edge effect path, and an equilibrium point.

Now referring to FIG. 5B, FIG. 5B is an illustration of an impedance plane plot 204 that plots or charts the resistance 172, or coil resistance, on the x-axis, and the inductive reactance 174 on the y-axis, of a lift-off path 178*b*, an edge effect path 196*a*, a reverse edge effect path 196*b*, and an equilibrium point 200. The resistance 172 is measured in ohms. The inductive reactance 174 is the frequency of the alternating current 106 (see FIG. 2) in hertz, and the inductance of the coil 52 in henrys. As shown in FIG. 5B, the impedance plane plot 204 shows the no lift-off point 162, the total lift-off point 166, and the equilibrium point 200. As further shown in FIG. 5B, the impedance plane plot 204 shows the trace 176 comprising the lift-off path 178*b*, formed as a curve between the no lift-off point 162 and the total lift-off point 166.

As shown in FIG. 5B, the impedance plane plot 204 shows a trace 194 comprising the edge effect path 196*a*, formed as a curve going from the no lift-off point 162 to the equilibrium point 200, and shows a trace 194 comprising the reverse edge effect path 196*b*, formed as a curve going from the equilibrium point 200 back to the no lift-off point 162. The equilibrium point 200 is where the edge effect path 196*a* (see FIG. 5B) begins to reverse itself to become the reverse edge effect path 196*b* (see FIG. 5B). If the gap 80 (see FIG. 5A) is narrower, there is less movement in the edge effect path 196*a* (see FIG. 5B) towards the total lift-off point 166 (see FIG. 5B), and if the gap 80 is wider, the change would be greater. It is the equilibrium point 200 (see FIG. 5B) that is used to determine the gap width 88 (see FIG. 5A).

Using reference gap standards 82 (see FIG. 1) that are known, the distance the signal 54 (see FIG. 1) travels up the edge effect path 196*a* (see FIG. 5B) may be known. If the gap 80 between two dissimilar materials 34 (see FIG. 1) needs to be measured, a reference gap standard 82 (see FIG. 1) may be produced to ensure an accurate measurement.

Now referring to FIG. 6, FIG. 6 is a schematic illustration of an exemplary version of the system 10, such as the automated system 10*a*, of the disclosure showing the probe 44, such as the eddy current probe 44*a*, with the coil 52 at various probe positions 210*a*-210*g* in the through holes 40 of the two conductive parts 15, such as the two test conductive parts 16, for example, two aircraft conductive parts 17, with the probe positions 210*a*-210*g* corresponding to various point in a graph 206. As shown in FIG. 6, the graph 206 shows resistance 172 on the y-axis and probe position 208 on the x-axis.

As further shown in FIG. 6, the system 10, such as the automated system 10*a*, shows the probe 44, such as the eddy current probe 44*a*, comprising the housing 50, such as the non-conductive housing 50*a*, with the coil 52 mounted within the housing 50. The coil 52 comprises the non-conductive protective member 60 (see FIG. 6) coupled to the exterior surface 58 (see FIG. 6) of the coil 52, to protect the coil 52 from wear. A magnetic field 158 (see FIG. 6) is formed around the coil 52 and the probe 44.

As further shown in FIG. 6, the probe 44, such as the eddy current probe 44*a*, is coupled, or attached to, a probe handle 216, via an extending arm portion 218. As further shown in FIG. 6, the probe handle 216 is coupled to the inspection instrument assembly 92, such as the eddy current test unit assembly 93. The probe 44 receives input, such as alternating current 106 (see FIG. 2), from the oscillator 104 (see FIG. 6), which is connected to the probe handle 216 via a connector element 98. As further shown in FIG. 6, output, such as in the form of signals 54 (see FIG. 1), from the probe 44 and coil 52 is transmitted to the amplifier 110, to the inspection apparatus 94 such as the oscilloscope 96, and to the controller and data acquisition assembly 124, which are connected to the probe handle 216 via one or more connector elements 98. One or more power supplies 116 (see FIG. 6) provide power to one or more of, the oscillator 104, the probe 44, the amplifier 110, the oscilloscope 96, and the controller and data acquisition assembly 124. An alarm device 118 (see FIG. 6) is coupled to the oscilloscope 96. As shown in FIG. 6, the controller and data acquisition assembly 124 coupled to the oscilloscope 96 comprises the controller 126, the computer 128, the processor 130, one or more storage devices 132, one or more software programs 134, and one or more data acquisition elements 135.

As shown in FIG. 6, the system 10, such as the automated system 10*a*, further comprises the two conductive parts 15, such as two test conductive parts 16, for example the two aircraft conductive parts 17. As shown in FIG. 6, the two conductive parts 15 comprise the first conductive part 15*a* and the second conductive part 15*b*; the two test conductive parts 16 comprise the first test conductive part 16*a* and the second test conductive part 16*b*; and the two aircraft conductive parts 17 comprise the first aircraft conductive part 17*a* and the second aircraft conductive part 17*b*.

As further shown in FIG. 6, the first conductive part 15a comprises the first surface 20a, the second surface 20c, the first edge 22a, the second edge 22b, and the through hole 40, such as through hole 40a, of the first conductive part 15a, in the form of drilled through hole 42. As further shown in FIG. 6, the second conductive part 15b comprises the first surface 20b, the second surface 20d, the first edge 22c, the second edge 22d, and the through hole 40, such as through hole 40b, of the second conductive part 15b, in the form of drilled through hole 42. The edges 22 (see FIG. 6) such as second edge 22b and first edge 22c, of the two conductive parts 15 (see FIG. 6), such as the two test conductive parts 16 (see FIG. 6), for example, the two aircraft conductive parts 17 (see FIG. 6), are preferably close proximity edges 23 (see FIG. 6).

As further shown in FIG. 6, the first conductive part 15a is comprised of the conductive material 28, such as the first conductive part conductive material 28a, and the second conductive part 15b is comprised of the conductive material 28, such as the second conductive part conductive material 28b. As further shown in FIG. 6, the through hole 40a has a diameter 38a, and the through hole 40b has a diameter 38b. As shown in FIG. 6, the length of the diameter 38a of the through hole 40a is preferably equal to the length of the diameter 38b of the through hole 40b. As further shown in FIG. 6, the gap 80 between the first conductive part 15a and the second conductive part 15b has a gap distance 86 comprising a gap width 88 of the gap 80.

FIG. 6 further shows the probe 44, such as the eddy current probe 44a, at various probe positions 210a-210g moving in a direction 212 through the through hole 40a, crossing the gap 80, and through the through hole 40b.

As shown in FIG. 6, the probe 44 is initially at a probe position 210a corresponding to a total lift-off point 166 on the graph 206, prior to the probe 44 entering the through hole 40a of the first conductive part 15a.

As shown in FIG. 6, the probe 44 then moves to a probe position 210b corresponding to a first edge effect point 214a on the graph 206, as the magnetic field 158 of the probe 44 reacts or interacts with the first edge 22a of the first conductive part 15a.

As shown in FIG. 6, the probe 44 then moves to a probe position 210c in the through hole 40a of the first conductive part 15a, corresponding to a no lift-off point 162 on the graph 206.

As shown in FIG. 6, the probe 44 then moves to a probe position 210d corresponding to an equilibrium point 200 on the graph 206, where the probe 44 with the coil 52 is centered between the second edge 22b of the first conductive part 15a and the first edge 22c of the second conductive part 15b.

As shown in FIG. 6, the probe 44 then moves to a probe position 210e in the through hole 40b of the second conductive part 15b, corresponding to another no lift-off point 162 on the graph 206.

As shown in FIG. 6, the probe 44 then moves to a probe position 210f corresponding to a second edge effect point 214b on the graph 206, as the magnetic field 158 of the probe 44 reacts or interacts with the second edge 22d of the second conductive part 15b.

As shown in FIG. 6, the probe 44 then moves to a probe position 210g corresponding to another total lift-off point 166 on the graph 206, after the probe 44 exits the through hole 40b of the second conductive part 15b.

Figure 7:
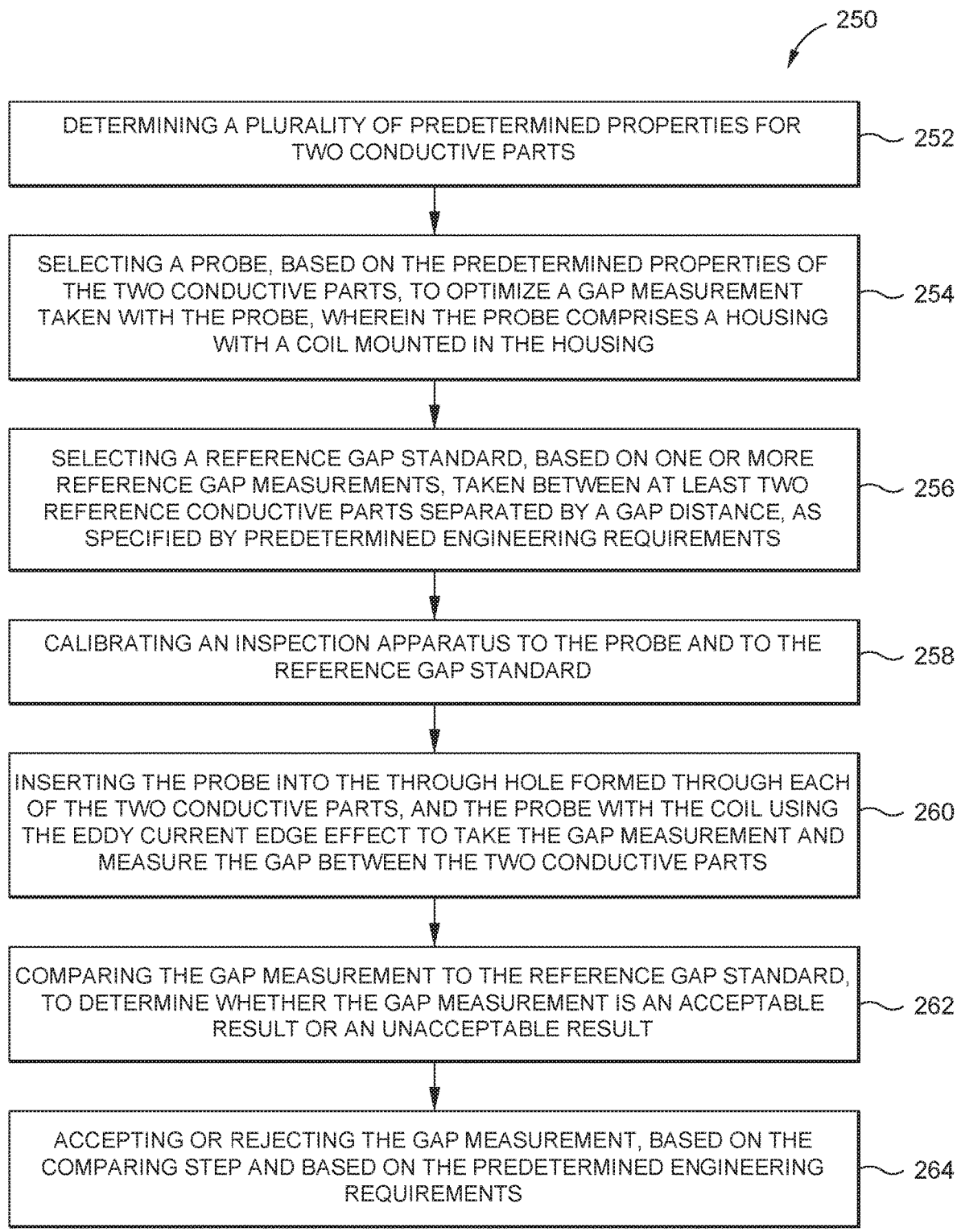
FIG. 7 is an illustration of a flow diagram of an exemplary version of a method of the disclosure.

Now referring to FIG. 7, FIG. 7 is an illustration of a flow diagram of an exemplary version of a method 250 of the disclosure. In another version of the disclosure, there is provided the method 250 (see FIG. 7) for using eddy current edge effect 12 (see FIG. 1) to measure a gap 80 (see FIGS. 1, 6) between two conductive parts 15 (see FIGS. 1, 6), such as two test conductive parts 16 (see FIGS. 1, 6), for example, two aircraft conductive parts 17 (see FIGS. 6, 8).

The blocks in FIG. 7 represent operations and/or portions thereof, or elements, and lines connecting the various blocks do not imply any particular order or dependency of the operations or portions thereof, or elements. FIG. 7 and the disclosure of the steps of the method 250 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 7, the method 250 comprises the step of determining 252 a plurality of predetermined properties 24a (see FIG. 1) for the two conductive parts 15, such as the two test conductive parts 16 (see FIG. 1), for example, two aircraft conductive parts 17 (see FIGS. 6, 8). The plurality of predetermined properties 24a preferably comprises the material type 26 (see FIG. 1), the material thickness 36 (see FIG. 1), and the diameter 38 (see FIG. 1) of a through hole 40 (see FIGS. 1, 6) formed through each of the two conductive parts 15, such as the test conductive parts 16, for example, two aircraft conductive parts 17 (see FIGS. 6, 8). Preferably, the two conductive parts 15 are made of a conductive material 28 (see FIG. 1), such as an electrically conductive material 28c (see FIG. 1). The conductive material 28 may also comprise non-magnetic materials, and may also comprise magnetic or permeable materials.

As shown in FIG. 7, the method 250 further comprises the step of selecting 254 a probe 44 (see FIGS. 1, 6), such as an eddy current probe 44a (see FIGS. 1, 6), based on the plurality of predetermined properties 24a of the two conductive parts 15, such as the two test conductive parts 16, for example, two aircraft conductive parts 17 (see FIGS. 6, 8), to optimize a gap measurement 84 (see FIG. 1), such as the test gap measurement 84a (see FIG. 1), taken with the probe 44. The probe 44 (see FIGS. 1, 6) preferably comprises the housing 50 (see FIGS. 1, 6), such as the non-conductive housing 50a (see FIGS. 1, 6) with the coil 52 (see FIGS. 1, 6), such as the test coil 52a (see FIG. 1) mounted within the housing 50.

The step of selecting 254 (see FIG. 7) the probe 44 may further comprise, selecting 254 the probe 44 to optimize the gap measurement 84, such as the test gap measurement 84a (see FIG. 1), using a plurality of variables 68 (see FIG. 1). The plurality of variables 68 preferably comprise the coil size 70 (see FIG. 1), the coil type 72 (see FIG. 1), or geometry or design, the test frequency 74 (see FIG. 1), conductivity 76 (see FIG. 1) of the two conductive parts 15, such as the test conductive parts 16, for example, the two aircraft conductive parts 17 (see FIGS. 6, 8), magnetic permeability 78 (see FIG. 1) of the two conductive parts 15, such as the test conductive parts 16, for example, the two aircraft conductive parts 17 (see FIGS. 6, 8), or another suitable variable 68.

As shown in FIG. 7, the method 250 further comprises the step of selecting 256 a reference gap standard 82 (see FIG. 1), based on one or more reference gap measurements 84b (see FIG. 1), taken between at least two reference conductive parts 18 (see FIG. 1), separated by a gap distance 86 (see FIG. 1), as specified by predetermined engineering requirements 90 (see FIG. 1). The predetermined engineering requirements 90 may comprise predetermined engineering specifications 90a (see FIG. 1), predetermined engineering drawings 90b (see FIG. 1), or other suitable predetermined engineering requirements 90.

As shown in FIG. 7, the method 250 further comprises the step of calibrating 258 an inspection apparatus 94 (see FIG. 2) to the probe 44 and calibrating to the reference gap standard 82. The inspection apparatus 94 is preferably coupled to the probe 44. The step of calibrating 258 (see FIG. 7) the inspection apparatus 94 to the probe 44 and to the reference gap standard 82, further comprises calibrating 258 the inspection apparatus 94 comprising an oscilloscope 96 (see FIG. 2). The oscilloscope 96 may display one or more of, the lift-off path 178 (see FIG. 3C) of the one or more signals 54 (see FIG. 1) of the probe 44 or coil 52, the edge effect path 196 (see FIG. 4D) or the edge effect path 196a (see FIG. 5B) of the one or more signals 54 of the probe 44 or coil 52, and/or the reverse edge effect path 196b (see FIG. 5B) of the one or more signals 54 of the probe 44 or coil 52, during taking of the gap measurement 84, such as the test gap measurement 84a, and measurement of the gap 80 between the two conductive parts 15, such as the test conductive parts 16, for example, the two aircraft conductive parts 17 (see FIGS. 6, 8).

In particular, the oscilloscope 96 may display the impedance plane plot 170 (see FIG. 3C), the impedance plane plot 192 (see FIG. 4D), the impedance plane plot 204 (see FIG. 5B), or another suitable impedance plane plot. The impedance plane plot may include the trace 176 (see FIGS. 3C, 4D, 5B), such as the lift-off path 178 (see FIG. 3C), the lift-off path 178a (see FIG. 4D), the lift-off path 178b (see FIG. 5B), or another suitable lift-off path of the one or more signals 54 (see FIG. 1) of the probe 44, during taking of the gap measurement 84 and measurement of the gap 80 between the two conductive parts 15, such as the test conductive parts 16, for example, the two aircraft conductive parts 17 (see FIGS. 6, 8). The impedance plane plot may further include the trace 194 (see FIGS. 4D, 5B), such as the edge effect path 196 (see FIG. 4D), the edge effect path 196a (see FIG. 5B), the reverse edge effect path 196b, or another suitable edge effect path of the one or more signals 54 of the probe 44 or coil 52, during taking of the gap measurement 84, and measurement of the gap 80 between the two conductive parts 15, such as the test conductive parts 16, for example, the two aircraft conductive parts 17 (see FIGS. 6, 8).

As shown in FIG. 7, the method 250 further comprises the step of inserting 260 the probe 44 into the through hole 40 (see FIGS. 1, 6) formed through each of the two conductive parts 15, such as the test conductive parts 16 (see FIGS. 1, 6), for example, two aircraft conductive parts 17 (see FIGS. 6, 8), and the probe 44 with the coil 52 using the eddy current edge effect 12 (see FIG. 1), to take the gap measurement 84 and measure the gap 80 between the two conductive parts 15, such as the test conductive parts 16, for example, two aircraft conductive parts 17 (see FIGS. 6, 8).

The step of inserting 260 (see FIG. 7) the probe 44 into the through hole 40 formed through each of the two conductive parts 15, such as the test conductive parts 16, for example, two aircraft conductive parts 17 (see FIGS. 6, 8), further comprises, inserting 260 the probe 44 with the coil 52, and centering the probe 44 with the coil 52 over the gap 80 between the two conductive parts 15, such as the test conductive parts 16, for example, two aircraft conductive parts 17 (see FIGS. 6, 8), to reach the equilibrium point 200 (see FIGS. 1, 5B, 6), where the edge effect path 196a (see FIG. 5B) reverses to become the reverse edge effect path 196b (see FIG. 5B). The equilibrium point 200 is used to determine the gap measurement 84, such as the test gap measurement 84a, comprising the gap width 88 (see FIGS. 1, 6).

The step of inserting 260 (see FIG. 7) the probe 44 into the through hole 40 formed through each of the two conductive parts 15, such as the test conductive parts 16, for example, the two aircraft conductive parts 17 (see FIGS. 6, 8), further comprises, inserting 260 the probe 44 with the coil 52 having the non-conductive protective member 60 coupled to the coil 52, to protect the coil 52 from wear. The non-conductive protective member 60 contacts the surface 20 (see FIG. 1) of each of the two conductive parts 15, such as the test conductive parts 16, for example, the two aircraft conductive parts 17 (see FIGS. 6, 8), and maintains the constant stand-off distance 62 (see FIG. 1) between the surface 20 and the coil 52.

As shown in FIG. 7, the method 250 further comprises the step of comparing 262 the gap measurement 84 (see FIG. 1), such as the test gap measurement 84a (see FIGS. 1, 2) to the reference gap standard 82 (see FIGS. 1, 2), to determine whether the gap measurement 84, such as the test gap measurement 84a, is an acceptable result 142 (see FIG. 2) or an unacceptable result 144 (see FIG. 2).

As shown in FIG. 7, the method 250 further comprises the step of accepting or rejecting 264 the gap measurement 84, based on the comparing 262 step and based on the predetermined engineering requirements 90 (see FIG. 1). The step of accepting or rejecting 264 (see FIG. 7) the gap measurement 84, such as the test gap measurement 84a, may further comprise activating an alarm device 118 (see FIGS. 1, 6), when the gap measurement 84, such as the test gap measurement 84a, that is taken is the unacceptable result 144 (see FIG. 2). The alarm device 118 delivers an alarm output 120 (see FIG. 2). The alarm output 120 may comprise a signal such as a light signal, a sound, a locking mechanism, or another type of alarm output 120. The alarm device 118 may further include a gate 122 (see FIG. 2) to notify a user when the gap measurement 84 is outside a range of specified values, based on the predetermined engineering requirements 90.

Now referring to FIG. 8, FIG. 8 is an illustration of a perspective view of an air vehicle 300, such as in the form of aircraft 300a, that incorporates conductive parts 15, such as aircraft conductive parts 17, including a first aircraft conductive part 17a and a second aircraft conductive part 17b, each having a through hole 40 (see FIGS. 1, 6), and with a gap 80 (see FIGS. 1, 6) between the aircraft conductive parts 17 that may be measured using an exemplary version of the system 10 and the method 250 of the disclosure.

As shown in FIG. 8, the air vehicle 300, such as in the form of aircraft 300a, comprises a fuselage 302, a nose 304, a cockpit 306, wings 308, engines 310, and an empennage 312 comprising a vertical stabilizer 314 and horizontal stabilizers 316. The air vehicle 300 (see FIG. 8), such as in the form of aircraft 300a (see FIG. 8), comprises the conductive parts 15, such as the aircraft conductive parts 17, including the first aircraft conductive part 17a and the second aircraft conductive part 17b. The conductive parts 15, such as the aircraft conductive parts 17, each have a through hole 40 (see FIGS. 1, 6), such as a drilled through hole 42 (see FIG. 6), and have a gap 80 (see FIGS. 1, 6) between them that may be measured using the system 10 (see FIG. 1) and method 250 (see FIG. 7) of the disclosure, prior to the aircraft conductive parts 17 being fastened together. The aircraft conductive parts 17 have drilled through holes 42 (see FIGS. 1, 6) through which a known fastener, such as a bolt, is inserted, to fasten the aircraft conductive parts 17 together, after obtaining an acceptable result 142 (see FIG. 2) from measuring the gap 80 with the system 10 and method 250 of the disclosure.

Figure 9:
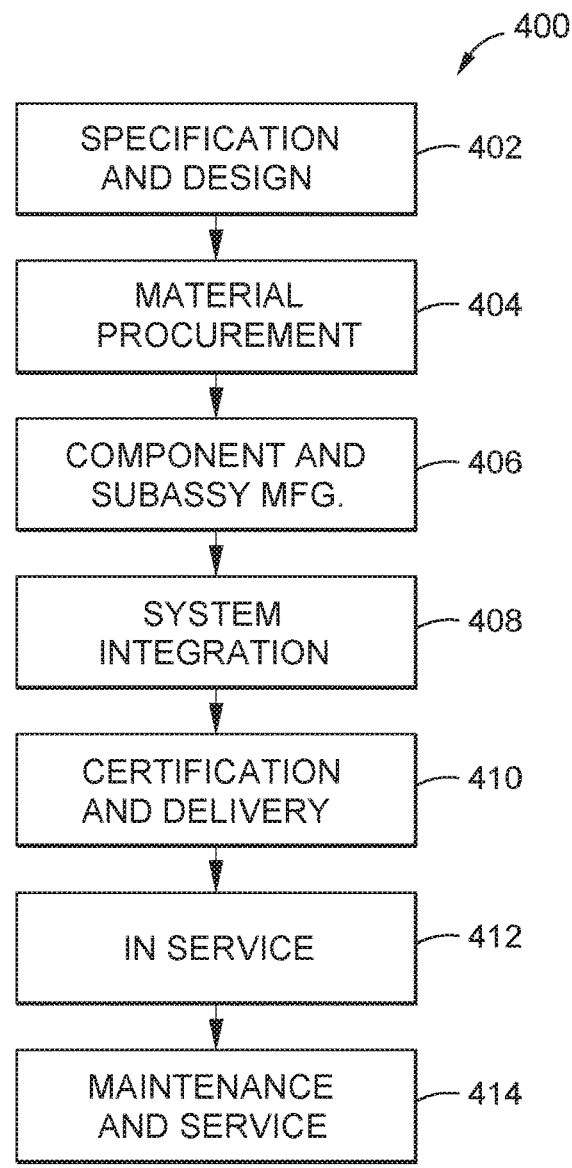
FIG. 9 is an illustration of a flow diagram of a version of an aircraft manufacturing and service method.
Figure 10:
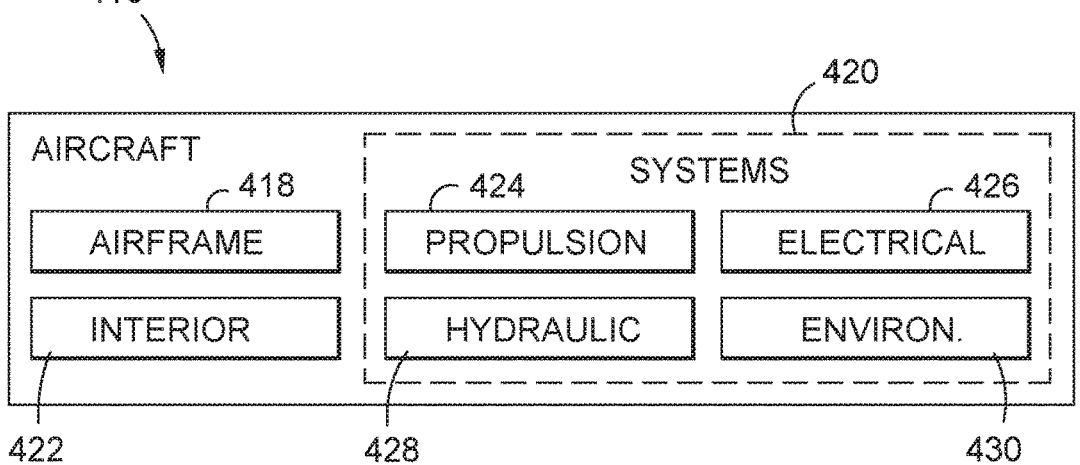
FIG. 10 is an illustration of a functional block diagram of a version of an aircraft.

Now referring to FIGS. 9 and 10, FIG. 9 is an illustration of a flow diagram of an exemplary aircraft manufacturing and service method 400, and FIG. 10 is an illustration of an exemplary block diagram of an aircraft 416. Referring to FIGS. 9 and 10, versions of the disclosure may be described in the context of the aircraft manufacturing and service method 400 as shown in FIG. 9, and the aircraft 416 as shown in FIG. 10.

During pre-production, exemplary aircraft manufacturing and service method 400 may include specification and design 402 of the aircraft 416 and material procurement 404. During manufacturing, component and subassembly manufacturing 406 and system integration 408 of the aircraft 416 takes place. Thereafter, the aircraft 416 may go through certification and delivery 410 in order to be placed in service 412. While in service 412 by a customer, the aircraft 416 may be scheduled for routine maintenance and service 414 (which may also include modification, reconfiguration, refurbishment, and other suitable services).

Each of the processes of the aircraft manufacturing and service method 400 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 10, the aircraft 416 produced by the exemplary aircraft manufacturing and service method 400 may include an airframe 418 with a plurality of systems 420 and an interior 422. Examples of the plurality of systems 420 may include one or more of a propulsion system 424, an electrical system 426, a hydraulic system 428, and an environmental system 430. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 400. For example, components or subassemblies corresponding to component and subassembly manufacturing 406 may be fabricated or manufactured in a manner similar to components or subassemblies produced while the aircraft 416 is in service 412. Also, one or more apparatus versions, method versions, or a combination thereof, may be utilized during component and subassembly manufacturing 406 and system integration 408, for example, by substantially expediting assembly of or reducing the cost of the aircraft 416. Similarly, one or more of apparatus versions, method versions, or a combination thereof, may be utilized while the aircraft 416 is in service 412, for example and without limitation, to maintenance and service 414.

Disclosed versions of the system 10 (see FIGS. 1, 6), and the method 250 (see FIG. 7) use the eddy current edge effect 12 (see FIG. 1) to measure the gap 80 (see FIG. 1) between two conductive parts 15 (see FIGS. 1, 6), such as two test conductive parts 16 (see FIGS. 1, 6), for example, two aircraft conductive parts 17 (see FIGS. 1, 6), and in particular, to measure the gap 80 through open holes, bolt holes, and through holes 40 (see FIGS. 1, 6) between the two conductive parts 15. Alternating current 106 (see FIG. 2) flowing through the probe 44 (see FIG. 1) and the coil 52 (see FIG. 1) at a chosen frequency 108 (see FIG. 2) generates the magnetic field 158 (see FIGS. 1, 6) around the coil 52. When the coil 52 (see FIGS. 1, 6) is positioned close to the conductive part 15, such as the test conductive part 16, for example, the aircraft conductive part 17, eddy current 160 (see FIGS. 1, 3A) is induced in the conductive material 28 (see FIGS. 1, 3A) of the conductive part 15. The magnetic field 158 reacts to the edge 22 (see FIGS. 1, 4B, 5A) of the conductive part 15. If the edge 22, such as the second edge 22*b* (see FIGS. 5A, 6), of the first conductive part 15*a* (see FIGS. 5A, 6), is in close proximity to another edge 22 (see FIGS. 5A, 6), such as the first edge 22*c* (see FIGS. 5A, 6) of the second conductive part 15*b* (see FIGS. 5A, 6), then as the magnetic field 158 is moved closer to the second edge 22*b* of the first conductive part 15*a*, the magnetic field 158 begins to react with the first edge 22*c* of the second conductive part 15*b*. This reaction may be plotted or charted with the inspection apparatus 94 (see FIG. 2), such as the oscilloscope 96 (see FIG. 2), and from that plot or chart, the gap distance 86 (see FIGS. 1, 6), such as the gap width 88 (see FIGS. 1, 6), may be determined.

In addition, disclosed versions of the system 10 provide for an automated system 10*a* (see FIGS. 1, 6) that is automated to report non-conformities and unacceptable results 144 (see FIG. 2), when the gap measurement 84 (see FIG. 1), such as the test gap measurement 84*a* (see FIGS. 1, 2), is compared to the reference gap standard 82 (see FIGS. 1, 2). The system 10, such as the automated system 10*a*, may be equipped with an alarm device 118 (see FIGS. 2, 6) having an alarm output 120 (see FIG. 2) to alert a user when the gap measurement 84 taken is the unacceptable result 144. Moreover, the automated system 10*a* may be attached to a robotic system 148 (see FIG. 1) with a robotic drilling and inspection apparatus 148*a* (see FIG. 1). The automated system 10*a* allows for the ability to instantly and immediately detect and identify a non-conformance, or unacceptable result 144 (see FIG. 2), before any further processing may be performed.

Further, disclosed versions of the system 10 (see FIGS. 1, 6), and the method 250 (see FIG. 7) allow for inspection and measurement of inaccessible areas, and do not require the use of a feeler gauge or an optical device, such as a borescope, to inspect and measure the gap 80 through the through holes 40 of the two conductive parts 15. Further, because the system 10 is preferably an automated system 10*a*, the time it takes to perform inspection and measurement is reduced, as compared to manual methods using a feeler gauge or optical device, such as a borescope. A reduction in time to perform the inspection and measurement with the automated system 10*a* may result in a reduction in labor and a reduction in overall costs to inspect and measure the gaps 80. Thus, the system 10 and method 250 may be used for any area that a visual inspection or test, a feeler gauge test, or the use of an optical device, such as a borescope, may not be possible or that has limited visual access, such as open holes or through holes 40 of two conductive parts 15, such as aircraft conductive parts 17, where fitment is in question or an issue, or that need a specific fit-up prior to being fastened. Moreover, the system 10 and method 250 may be helpful to manufacturers that have a gap tolerance measurement requirement for holes, such as through holes 40.

In addition, disclosed versions of the system 10 (see FIGS. 1, 6), and the method 250 (see FIG. 7) allow for visibility through sealants that may be used on surfaces of the conductive parts 15, such as the aircraft conductive parts 17. This visibility provided by the system 10, such as the automated system 10a, may reduce the time to inspect and measure the gaps 80, as compared to manual methods using a feeler gauge or optical device, such as a borescope, which may not be able to visually inspect and measure through the sealants.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation.

What is claimed is:

1. A system for using eddy current edge effect to measure a gap between two conductive parts, the system comprising:
    two conductive parts, each having a plurality of predetermined properties comprising a material type, a material thickness, and a diameter of a through hole formed through each of the two conductive parts;
    a probe comprising a housing with a coil mounted within the housing, the probe configured to contact the two conductive parts to take a gap measurement;
    a reference gap standard, based on one or more reference gap measurements, taken between at least two reference conductive parts separated by a gap distance, as specified by predetermined engineering requirements; and
    an inspection instrument assembly coupled to the probe, the inspection instrument assembly comprising an inspection apparatus calibrated to the probe and to the reference gap standard,
    wherein the probe is inserted into the through hole formed through each of the two conductive parts, and the probe with the coil uses the eddy current edge effect to take the gap measurement and measure the gap between the two conductive parts, and
    further wherein the gap measurement is compared to the reference gap standard, to determine whether the gap measurement is an acceptable result or an unacceptable result, based on the predetermined engineering requirements.

2. The system of claim 1, wherein a plurality of variables are used to optimize the gap measurement, and the plurality of variables comprise a coil size, a coil type, a test frequency, conductivity of the two conductive parts, and magnetic permeability of the two conductive parts.

3. The system of claim 1, wherein the coil further comprises a non-conductive protective member coupled to the coil, to protect the coil from wear, and further wherein the non-conductive protective member contacts a surface of the through hole of each of the two conductive parts, and maintains a constant stand-off distance between the surface and the coil.

4. The system of claim 1, wherein the coil has an interaction between a magnetic field around the coil and one or both of the two conductive parts, as the coil travels across the gap between the two conductive parts.

5. The system of claim 1, wherein the inspection apparatus comprises an oscilloscope, and the oscilloscope displays one or more of, a lift-off path of a signal of the probe, and an edge effect path of the signal of the probe, including a reverse edge effect path of the signal of the probe, during taking of the gap measurement and measurement of the gap between the two conductive parts.

6. The system of claim 5, wherein the probe with the coil is centered over the gap between the two conductive parts, to reach an equilibrium point, where the edge effect path reverses to become the reverse edge effect path, and further wherein the equilibrium point is used to determine the gap measurement comprising a gap width.

7. The system of claim 1, wherein the inspection instrument assembly further comprises an alarm device that is activated when the gap measurement that is taken is the unacceptable result.

8. The system of claim 1, wherein the inspection instrument assembly further comprises one or more of, an oscillator, an amplifier, one or more power supplies, one or more connector elements, and a controller and data acquisition assembly.

9. The system of claim 1, wherein the system is an automated system coupled to a robotic drilling and inspection apparatus, and the through hole formed through each of the two conductive parts is a drilled through hole.

10. An automated system for using eddy current edge effect to measure a gap between two aircraft conductive parts, the automated system comprising:
    two aircraft conductive parts, each having a plurality of predetermined properties comprising a material type, a material thickness, and a diameter of a through hole formed through each of the two aircraft conductive parts;
    an eddy current probe comprising a housing with a coil mounted within the housing, the eddy current probe configured to contact the two aircraft conductive parts to take a gap measurement comprising a gap width of the gap between the two aircraft conductive parts;
    a reference gap standard, based on one or more reference gap measurements, taken between at least two reference conductive parts separated by a gap distance, as specified by predetermined engineering requirements; and
    an inspection instrument assembly coupled to the eddy current probe, the inspection instrument assembly comprising an oscilloscope calibrated to the eddy current probe and to the reference gap standard, and comprising an alarm device,
    wherein the eddy current probe is inserted into the through hole formed through each of the two aircraft conductive parts, and the eddy current probe with the coil uses the eddy current edge effect to take the gap measurement comprising the gap width and measure the gap between the two aircraft conductive parts, and
    further wherein the gap measurement is compared to the reference gap standard, to determine whether the gap measurement is an acceptable result or an unacceptable result, based on the predetermined engineering requirements, and wherein the alarm device is activated when the gap measurement that is taken is the unacceptable result.

11. The automated system of claim 10, wherein a plurality of variables are used to optimize the gap measurement, and the plurality of variables comprise a coil size, a coil type, a test frequency, conductivity of the two aircraft conductive parts, and magnetic permeability of the two aircraft conductive parts.

12. The automated system of claim 10, wherein the coil further comprises a non-conductive protective member coupled to the coil, to protect the coil from wear, and further wherein the non-conductive protective member contacts a surface of the through hole of each of the two aircraft conductive parts, and maintains a constant stand-off distance between the surface and the coil.

13. The automated system of claim 10, wherein the eddy current probe with the coil is centered over the gap between the two aircraft conductive parts, to reach an equilibrium point, and further wherein the equilibrium point is used to determine the gap measurement comprising the gap width.

14. The automated system of claim 10, wherein the automated system is coupled to a robotic drilling and inspection apparatus, and the through hole formed through each of the two aircraft conductive parts is a drilled through hole drilled by the robotic drilling and inspection apparatus.

15. A method for using eddy current edge effect to measure a gap between two conductive parts, the method comprising the steps of:
   determining a plurality of predetermined properties for the two conductive parts, the plurality of predetermined properties comprising a material type, a material thickness, and a diameter of a through hole formed through each of the two conductive parts;
   selecting a probe, based on the plurality of predetermined properties of the two conductive parts, to optimize a gap measurement taken with the probe, wherein the probe comprises a housing with a coil mounted within the housing;
   selecting a reference gap standard, based on one or more reference gap measurements, taken between at least two reference conductive parts separated by a gap distance, as specified by predetermined engineering requirements;
   calibrating an inspection apparatus to the probe and to the reference gap standard;
   inserting the probe into the through hole formed through each of the two conductive parts, and the probe with the coil using the eddy current edge effect to take the gap measurement and measure the gap between the two conductive parts;
   comparing the gap measurement to the reference gap standard, to determine whether the gap measurement is an acceptable result or an unacceptable result; and
   accepting or rejecting the gap measurement, based on the comparing step and based on the predetermined engineering requirements.

16. The method of claim 15, wherein selecting the probe further comprises, selecting the probe to optimize the gap measurement using a plurality of variables comprising a coil size, a coil type, a test frequency, conductivity of the two conductive parts, and magnetic permeability of the two conductive parts.

17. The method of claim 15, wherein calibrating the inspection apparatus to the probe and to the reference gap standard, further comprises calibrating the inspection apparatus comprising an oscilloscope, wherein the oscilloscope displays one or more of, a lift-off path of a signal of the probe, and an edge effect path of the signal of the probe, including a reverse edge effect path of the signal of the probe, during taking of the gap measurement and measurement of the gap between the two conductive parts.

18. The method of claim 17, wherein inserting the probe into the through hole formed through each of the two conductive parts further comprises, inserting the probe with the coil, and centering the probe with the coil over the gap between the two conductive parts, to reach an equilibrium point where the edge effect path reverses to become the reverse edge effect path, and further wherein the equilibrium point is used to determine the gap measurement comprising a gap width.

19. The method of claim 15, wherein inserting the probe into the through hole formed through each of the two conductive parts further comprises, inserting the probe with the coil having a non-conductive protective member coupled to the coil, to protect the coil from wear, and further wherein the non-conductive protective member contacts a surface of each of the two conductive parts, and maintains a constant stand-off distance between the surface and the coil.

20. The method of claim 15, wherein accepting or rejecting the gap measurement, further comprises activating an alarm device, when the gap measurement that is taken is the unacceptable result.

* * * * *